(12) United States Patent
Aoki et al.

(10) Patent No.: US 8,950,868 B2
(45) Date of Patent: Feb. 10, 2015

(54) HEAD-UP DISPLAY DEVICE

(75) Inventors: Kunimitsu Aoki, Susono (JP);
Nobuyuki Takahashi, Susono (JP)

(73) Assignee: Yazaki Corporation, Tokyo (JP)

(*) Notice: Subject to any disclaimer, the term of this patent is extended or adjusted under 35 U.S.C. 154(b) by 331 days.

(21) Appl. No.: 13/516,089

(22) PCT Filed: Dec. 17, 2010

(86) PCT No.: PCT/JP2010/072812
§ 371 (c)(1),
(2), (4) Date: Jun. 14, 2012

(87) PCT Pub. No.: WO2011/074679
PCT Pub. Date: Jun. 23, 2011

(65) Prior Publication Data
US 2012/0256812 A1 Oct. 11, 2012

(30) Foreign Application Priority Data
Dec. 18, 2009 (JP) ................. 2009-288069

(51) Int. Cl.
*G03B 21/00* (2006.01)
*G02B 27/01* (2006.01)
(Continued)

(52) U.S. Cl.
CPC ............ *G02B 27/0101* (2013.01); *B60K 35/00* (2013.01); *G02B 6/00* (2013.01);
(Continued)

(58) Field of Classification Search
CPC ................. G02B 2027/14; G02B 2027/0187; G02B 27/01; G02B 27/0149; G02B 27/0101; G02B 27/0172; B60R 1/12; B60R 1/1206

USPC ...................... 353/13, 15, 37, 79, 85, 98, 119;
362/23.09, 489, 555, 800; 385/115,
385/116, 14, 1, 901, 32; 359/13, 15, 630;
345/5, 7; 348/115, 117, 118, 744–747
See application file for complete search history.

(56) References Cited

U.S. PATENT DOCUMENTS 4,711,544 A 12/1987 Iino et al.
4,886,328 A 12/1989 Iino
(Continued)

FOREIGN PATENT DOCUMENTS

CN 1629930 A 6/2005
CN 1856415 A 11/2006
(Continued)

OTHER PUBLICATIONS

Office Action dated Dec. 10, 2013 issued by the State Intellectual Property Office of the People's Republic of China in counterpart Chinese Patent Application No. 201080057772.9.
(Continued)

*Primary Examiner* — Sultan Chowdhury
(74) *Attorney, Agent, or Firm* — Sughrue Mion, PLLC

(57) ABSTRACT

The head-up display device sequentially displays a virtual image (51V) of a guide light from one end of a reflector (30) side, in the back inside of a virtual image (83V) of an opening bezel formed into a square frame displayed along an outer edge of a projection area (71) of a window shield, and further displays a virtual image (20V) of display information in the back thereof. The amount of travel of the virtual images (51V) of the guide light when the reflector provided in the head-up display device rotates is smaller than the amount of travel of the virtual image (20V) of the display information. Therefore, even if the virtual image (20V) of the display information falls outside the projection area, the virtual images (51V) of the guide light remain in the projection area, and are displayed.

10 Claims, 17 Drawing Sheets

(51) Int. Cl.
*B60K 35/00* (2006.01)
*G02B 6/00* (2006.01)

(52) U.S. Cl.
CPC . *G02B2027/0127* (2013.01); *G02B 2027/0141* (2013.01); *B60K 2350/1084* (2013.01); *B60K 2350/2052* (2013.01)
USPC .................. 353/13; 353/37; 353/79; 353/85; 353/119; 345/7

(56) References Cited

U.S. PATENT DOCUMENTS

| | | | | |
|---|---|---|---|---|
| 5,905,477 | A | * | 5/1999 | Kuwayama et al. ............... 345/7 |
| 6,574,048 | B2 | * | 6/2003 | Nill ............................... 359/632 |
| 7,271,960 | B2 | * | 9/2007 | Stewart et al. ................. 359/630 |
| 7,532,175 | B2 | * | 5/2009 | Aoki et al. ......................... 345/7 |
| 7,937,667 | B2 | * | 5/2011 | Kramer et al. ................ 715/781 |
| 7,952,808 | B2 | * | 5/2011 | Hotta et al. ................... 359/630 |
| 2004/0032971 | A1 | * | 2/2004 | Nagaoka et al. .............. 382/103 |
| 2004/0252940 | A1 | * | 12/2004 | Atac et al. ....................... 385/31 |
| 2005/0154505 | A1 | | 7/2005 | Nakamura et al. |
| 2006/0215244 | A1 | * | 9/2006 | Yosha et al. .................... 359/15 |
| 2007/0115205 | A1 | | 5/2007 | Uchiyama |
| 2008/0192312 | A1 | | 8/2008 | Hendricks et al. |
| 2009/0201225 | A1 | | 8/2009 | Okada et al. |

FOREIGN PATENT DOCUMENTS

| | | |
|---|---|---|
| CN | 101241234 A | 8/2008 |
| EP | 0709709 A1 | 5/1996 |
| JP | 6272231 U | 5/1987 |
| JP | 2760767 B2 | 3/1998 |
| JP | 200615941 A | 1/2006 |
| JP | 2009163084 A | 7/2009 |

OTHER PUBLICATIONS

International Search Report dated Feb. 1, 2011 from the International Searching Authority in counterpart application No. PCT/JP2010/072812.

Written Opinion dated Feb. 1, 2011 from the International Searching Authority in counterpart application No. PCT/JP2010/072812.

* cited by examiner

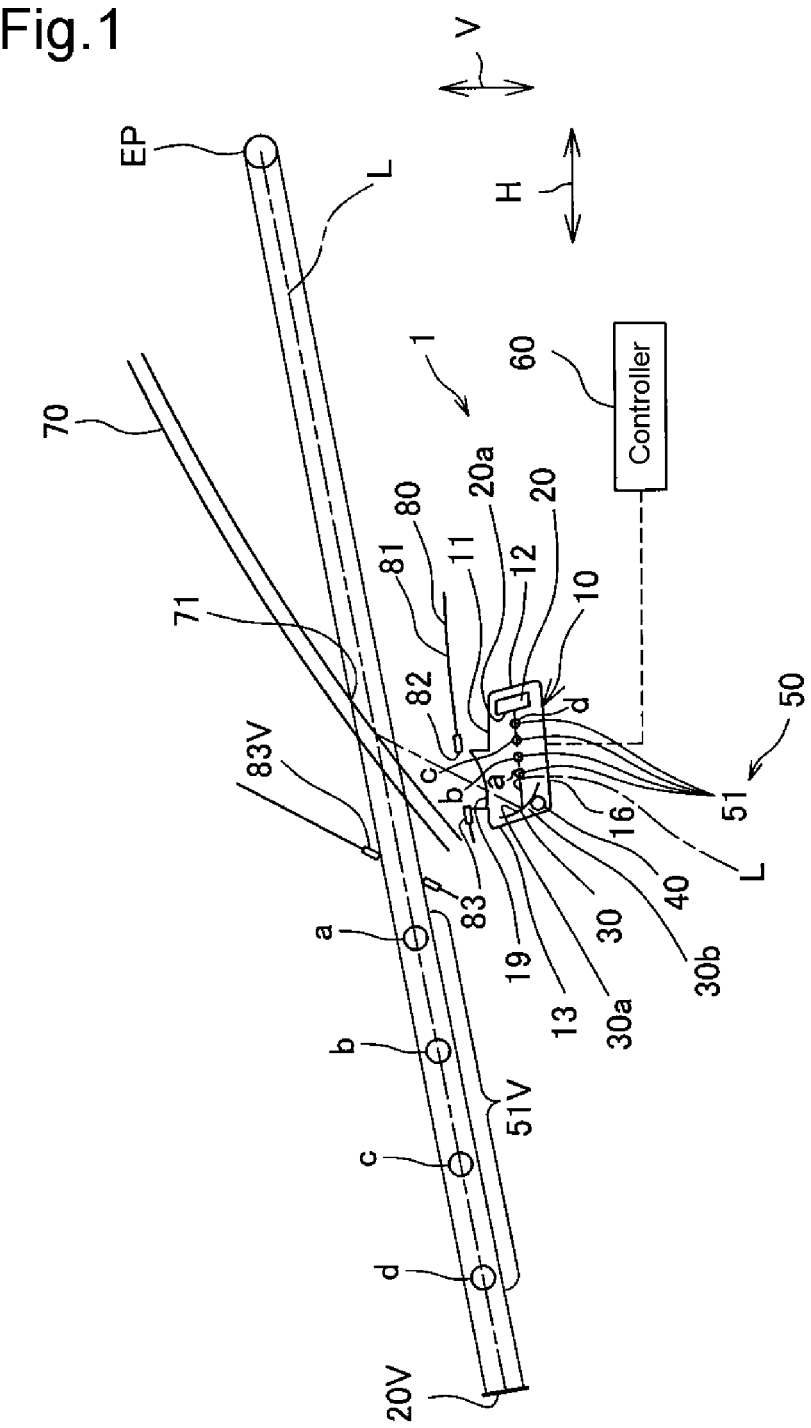

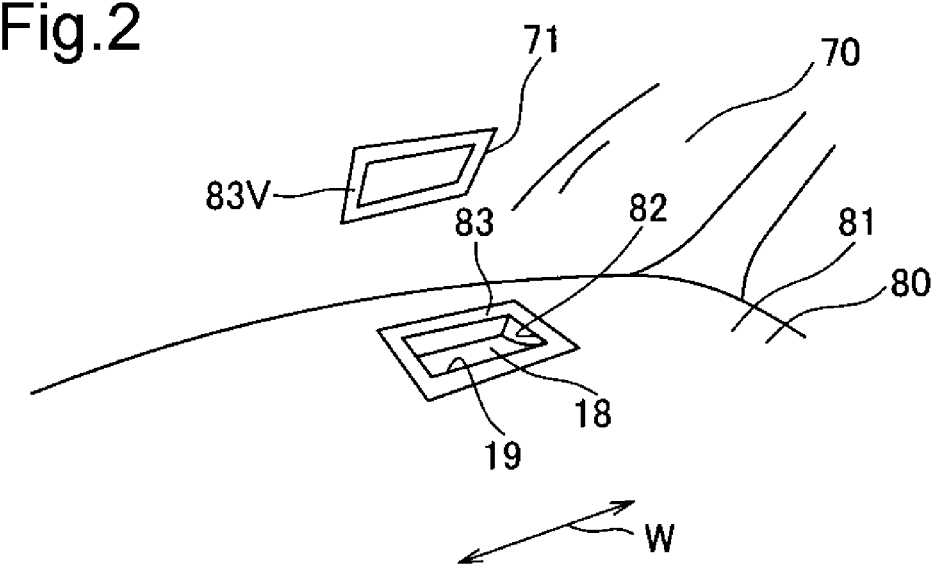
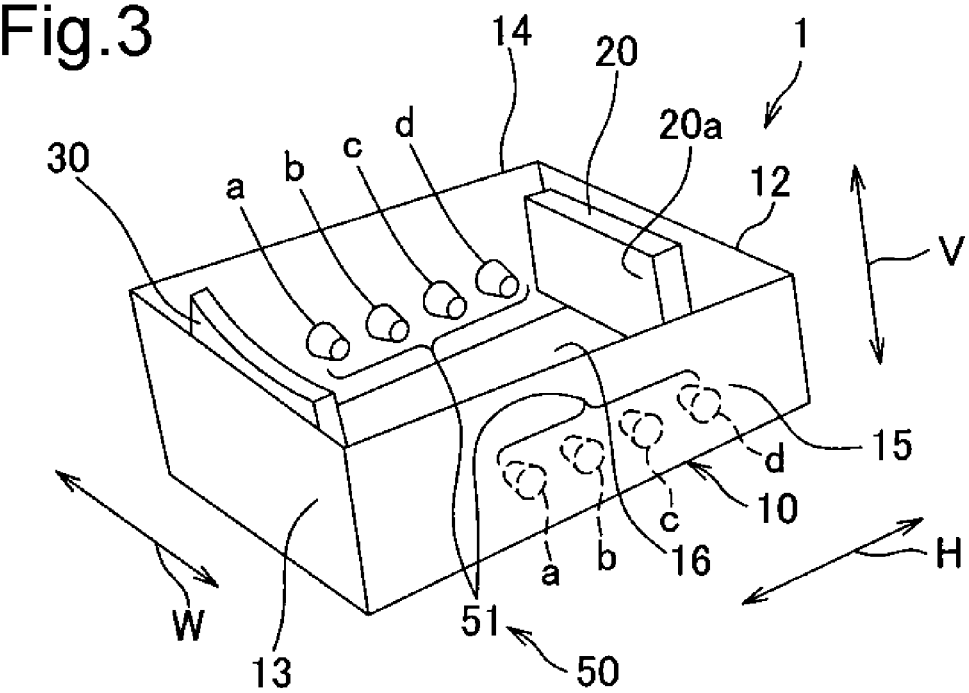

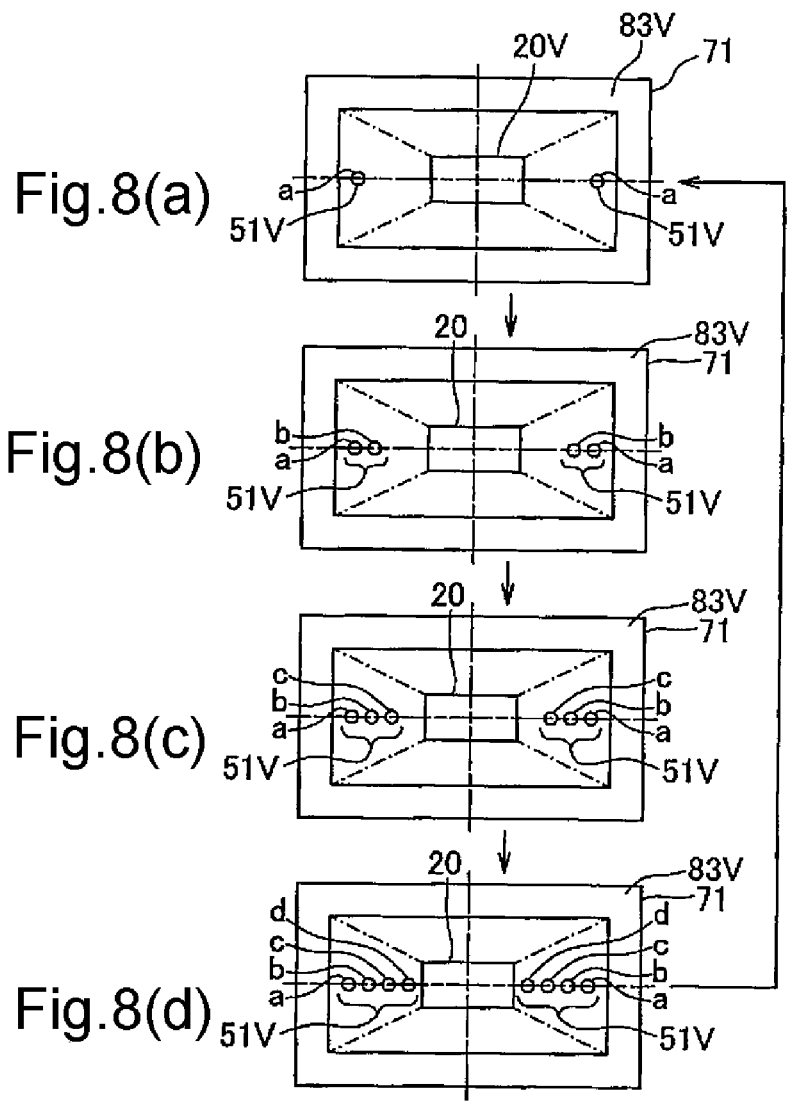

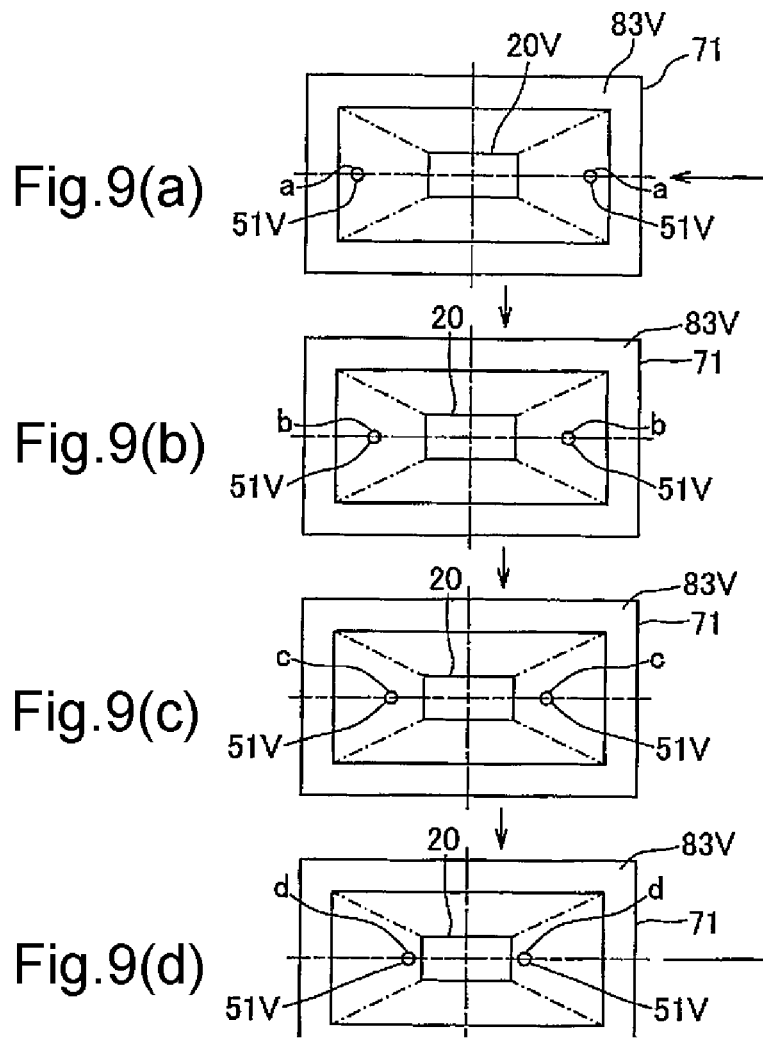
Fig.9(a)
Fig.9(b)
Fig.9(c)
Fig.9(d)
Fig.10
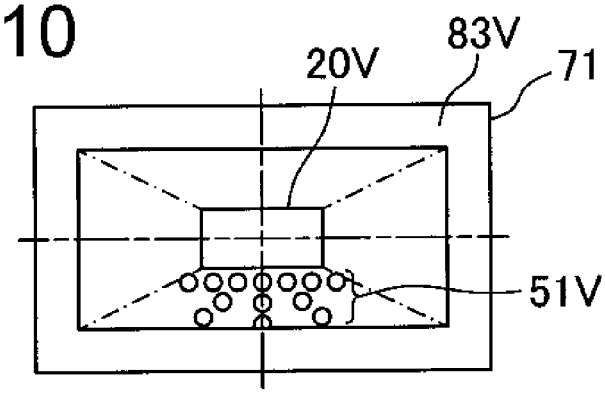

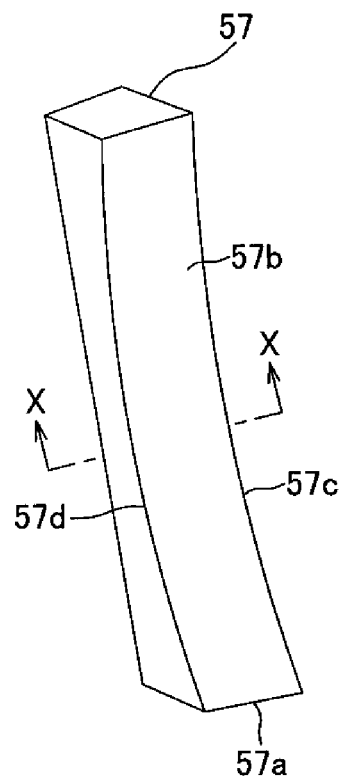
Fig.18(a)
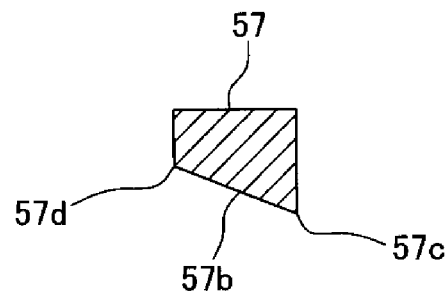
Fig.18(b)
Fig.19
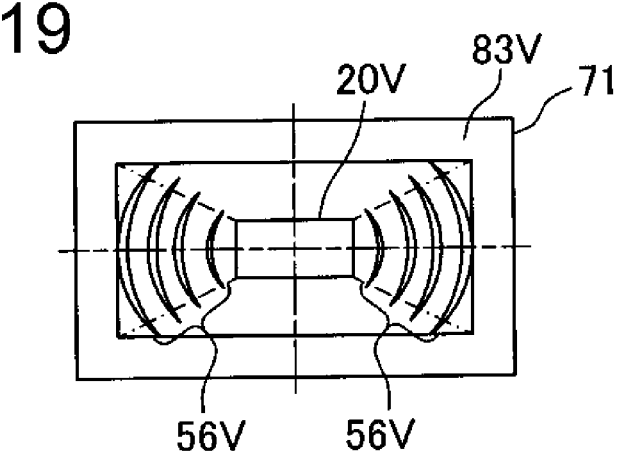

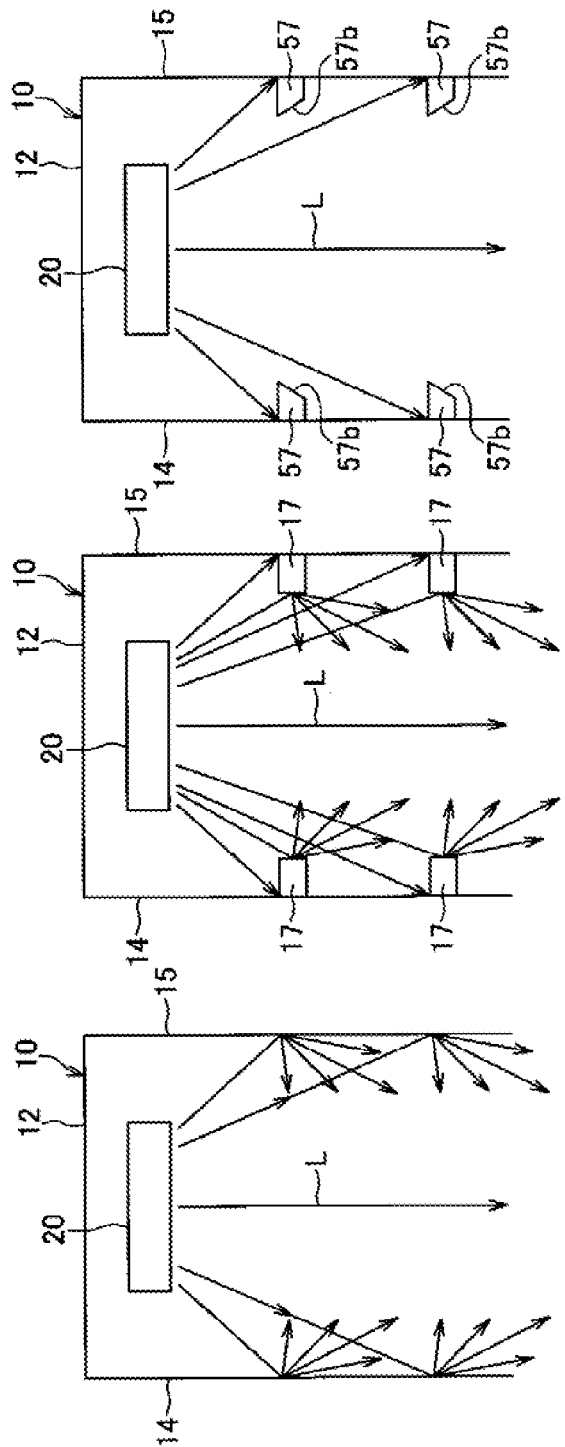

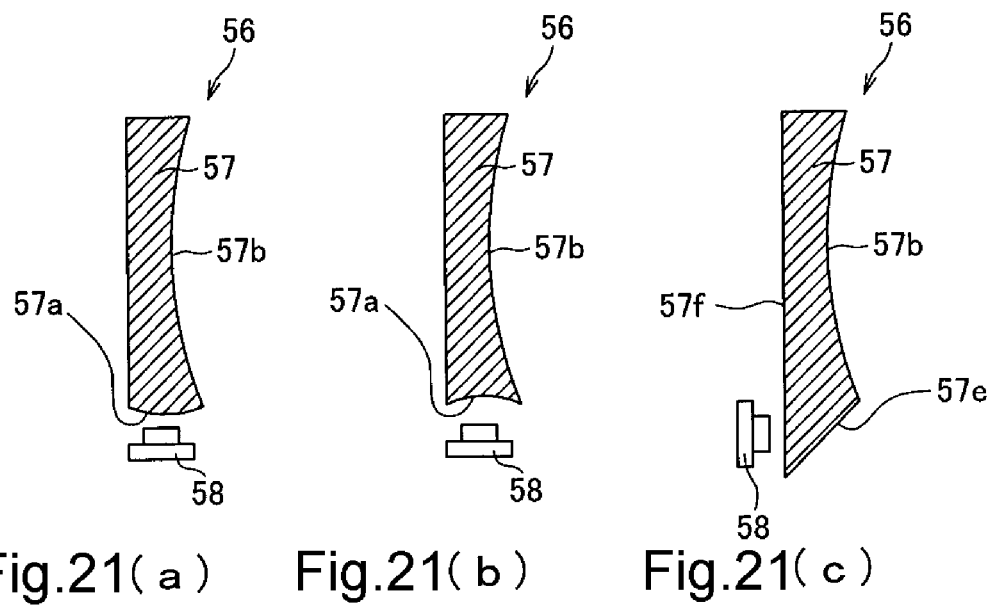
Fig.21(a)  Fig.21(b)  Fig.21(c)
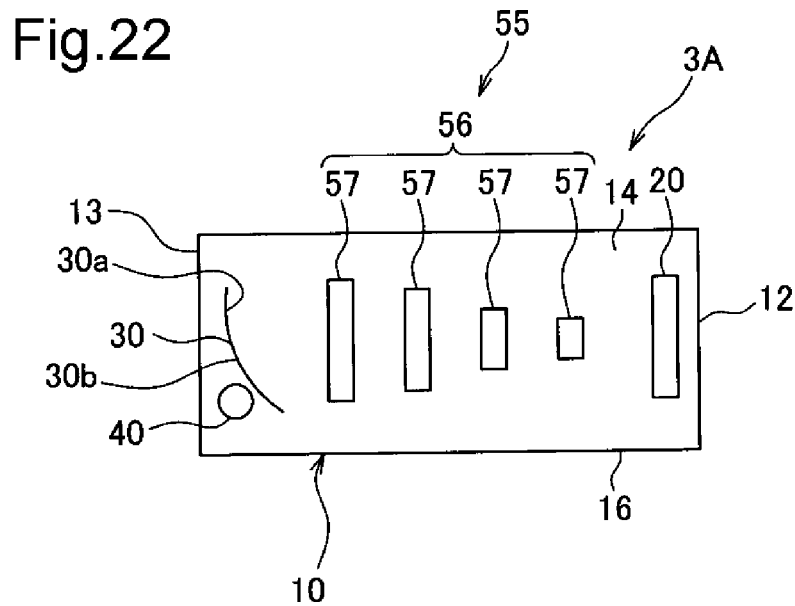

HEAD-UP DISPLAY DEVICE

TECHNICAL FIELD

The present invention relates to a head-up display device having a display source, and a reflector that reflects a display light of display information displayed on the display source toward a window shield side projection area of a vehicle, and allowing a virtual image of the display information projected to the projection area by the reflector and a foreground of the vehicle viewed through the window shield to be visually recognized in a superimposed manner.

BACKGROUND ART

In recent years, with increased and diversified information required by a driver for driving, head-up display devices (hereinafter also referred to as "HUD (head up display) devices") that display a virtual image of information to be notified the driver of such as information high in the degree of urgency on the window shield of the vehicle, and allow the virtual image and the foreground of the vehicle to be visually recognized in the superimposed manner have been employed for driver seats of the vehicles such as automobiles or trains.

The HUD device of this type arranges the display source inside of a dashboard of the vehicle, reflects the display light indicative of the display information such as images or characters displayed by the display source toward the projection area provided in the window shield by the reflector such as a magnifying mirror, displays the virtual image of the display information on the projection area, and allows the virtual image and the foreground of the vehicle to be visually recognized in the superimposed manner (for example, refer to Patent Literature 1).

Incidentally, drivers are different in eye level due to individual differences such as seating heights. For that reason, in the HUD device where a range (hereinafter referred to as "eye range") of an eye position at which the virtual image of the display information displayed on the projection area can be viewed is limited, unless the display light forming the virtual image of the display information faces the driver's eyes, the driver cannot sufficiently visually recognize the superimposed display information. For that reason, there is disclosed the HUD device in which an adjustment unit is provided for adjusting an installation angle (that is, posture) of the reflector, and the driver per se adjusts the adjustment unit so that the display light faces the driver's eyes according to the adjustment.

As illustrated in FIG. 23, an HUD device 701 of this type includes a box-shaped case 710 having an opening 719, a display source 720 disposed within the case 710, a reflector 730 rotatably disposed within the case 710, and a driver 740 functioning as the adjustment unit for rotating the reflector 730.

The case 710 is disposed inside of a dashboard 780 of the vehicle. The opening 719 of the case 710 coincides with an opening 782 formed in an upper surface 781 of the dashboard 780. Also, an opening bezel 783 of a square frame shape is disposed along an edge of the opening 782. The opening bezel 783 emits a light, and the light is so projected as to coincide with an outer edge of a projection area 771 of a window shield 770 to display a virtual image 783V thereof. The reflector 730 is configured by, for example, a magnifying mirror, and reflects the display light of the display information displayed on the display source 720 toward the projection area 771 disposed in the window shield 770 of the vehicle through the opening 719 of the case 710. With this configuration, a virtual image 720V of the display information is displayed on the projection area 771. The driver 740 includes, for example, a motor and a gear mechanism. The driver 740 rotates the reflector 730 so as to move a projection position (that is, position of virtual image 720V of display information) of the display light on the projection area 771 in a vertical direction of the vehicle on the basis of a control signal transmitted from a controller not shown by operating an operation switch not shown disposed on the dashboard 780 through the driver. Thus, the driver 740 adjusts the installation angle.

The HUD device 701 projects the display light of the display information on the display source 720 to the projection area 771, and displays the virtual image 720V of the display information inside of the virtual image 783V of the opening bezel 783 (FIG. 24(a)). Also, as illustrated in FIG. 23, the HUD device 701 adjusts the installation angle of the reflector 730 according to an eye position EPC of a driver with a standard seating height, an eye position EPH of a driver with a high seating height, or an eye position EPL of a driver with a low seating height. Then, the HUD device 701 displays the virtual image 720V of the display information at a position (720VC) visually recognizable by the driver with the standard seating height, a position (720VH) visually recognizable by the driver with the high seating height, or a position (720VL) visually recognizable by the driver with the low seating height.

According to the HUD device 701 of this type, even when the driver different in the level of the eye position such as the driver with the standard seating height, the driver with the high seating height, or the driver with the low seating height gets on the vehicle, the installation angle is adjusted by rotating the reflector 730. As a result, the projection position of the display light travels in the vertical direction so that the display light is directed at the eye of each driver (that is, the above-mentioned eye range). This makes it possible to adjust the virtual image 720V of the display information to a visually recognizable position.

CITATION LIST

Patent Literature

Patent Literature 1: Japanese Utility Model Unexamined Application Publication No. Sho 62(1987)-72231

SUMMARY OF INVENTION

Technical Problem

However, in the above-mentioned HUD device 701, when the display light falls outside the above eye arrange, for example, when the driver with the high seating height gets on the vehicle or the driver with the low seating height gets on the vehicle in a state where the position of the virtual image of the display information is adjusted for the driver with the standard seating height, the virtual image of the display information is not displayed (visually recognized) in the projection area 771. Therefore, the driver is not sure whether the virtual image 720V of the display information is located above the projection area 771 (FIG. 24(b)), or located below the projection area 771 (FIG. 24(c)). For that reason, the driver cannot determine a direction along which the virtual image 720V of the display information travels, resulting in such a problem that the position of the virtual image 720V of the display information cannot be accurately adjusted such that the driver attempts to further move the virtual image 720V upward although the virtual image 720V is located above the projection area 771, or the driver attempts to further move the virtual image 720V downward although the virtual image 720V is located below the projection area 771. Also, the virtual image of the display information in the HUD device 701 is generally displayed to be seen ahead of the eye position of the driver by a few meters (about 2 to 2.5 m), and is visually recognized together with an object to be compared such as a bonnet of the vehicle, thereby allowing the driver to achieve a sense of distance. However, the bonnet cannot be visually recognized by the driver depending on the vehicles, resulting in such a problem that the provision of only the HUD device 701 makes it difficult to achieve the sense of distance to the virtual image 720V.

The present invention aims at solving the above problems. That is, an object of the present invention is to provide a head-up display device that can precisely adjust a vertical position of the display information, and can also easily achieve the sense of distance.

Solution to Problem

In order to achieve the above object, according to a first aspect of the invention, there is provided a head-up display device including a box-shaped case having an opening, a display source that is disposed within the case, a reflector that is displaceably disposed within the case so as to reflect the display light of the display information displayed on the display source toward a projection area disposed in a window shield of a vehicle through an opening of the case, and a reflector displacement unit that displaces the reflector so as to move a projection position of the display light on the projection area in a vertical direction of the vehicle. The head-up display device is equipped with a guide light unit having at least one of a plurality of luminous bodies aligned along an optical path of the display light, and a rod-like luminous body arranged along the optical path of the display light, on an inner surface of the case between the display source and the reflector.

According to the first aspect of the present invention, the guide light unit is equipped with at least one of the plurality of luminous bodies aligned along the optical path of the display light (that is, in parallel to or substantially in parallel to the optical path), and the rod-like luminous body arranged along the optical path of the display light, on the inner surface of the case between the display source and the reflector. Therefore, light (that is, guide light) emitted from the luminous bodies is reflected by the reflector and projected to the projection area together with the display light of the display source. For that reason, when the reflector is displaced by the reflector displacement unit, the projection position of the guide light (that is, the position of the virtual images of the guide light) travels in the vertical direction together with the projection position of the display light of the display source (that is, position of the virtual image of the display information). Also, the luminous bodies are arranged closer to the reflector than the display source. Therefore, the virtual images of the guide light are displayed closer to the driver (near side) than the virtual image of the display information, and the amount of travel of the virtual images of the guide light when the reflector is displaced becomes smaller than the amount of travel of the virtual image of the display information. Also, the amount of travel of the virtual images of the guide light on one end closer to the driver becomes smaller than the amount of travel on the other end farther from the driver (that is, closer to the virtual image of the display information).

According to a second aspect of the present invention, in the first aspect of the present invention, the luminous bodies are disposed in parallel to the optical path of the display light on at least one inner surface of a pair of side walls of the case which face each other in a horizontal direction of the display source.

According to the second embodiment, the luminous bodies are disposed in parallel to the optical path of the display light on at least one inner surface of the pair of side walls of the case which face each other in the horizontal direction of the display source. Therefore, when the virtual image of the display information is displayed on the projection area so as to face a front of the driver, the virtual images of the guide light become horizontal.

According to a third aspect of the present invention, in the first and second aspects of the present invention, there is provided a light emitting control unit that allows the luminous bodies to emit light in the order from one end thereof toward the other end.

According to the third aspect of the present invention, since there is provided the light emitting control unit that allows the luminous bodies to emit light in the order from one end thereof toward the other end, the virtual images of the guide light can travel along a visual recognition direction of the driver.

According to a fourth aspect of the present invention, in the first to third aspects of the present invention, the guide light unit includes the plurality of luminous bodies, the plurality of luminous bodies each includes a light source, and a prismatic light guide member that is protruded from the inner surface of the case so that a longitudinal direction thereof is orthogonal to the optical path of the display light, and guides the light of the light source to a light emitting surface facing the inside of the case, and allows the light to be emitted therefrom, and the light emitting surface of the light guide member is inclined to be closer to the inner surface of the case toward the reflector from the display source.

According to the fourth aspect of the present invention, the guide light unit includes the plurality of luminous bodies, the plurality of luminous bodies each includes the light source, and the prismatic light guide member that is protruded from the inner surface of the case so that a longitudinal direction thereof is orthogonal to the optical path of the display light, and guides the light of the light source to the light emitting surface facing the inside of the case, and allows the light to be emitted therefrom. With this configuration, the virtual images of the guide light are largely displayed as compared with the point-like luminous bodies. Also, the display light of the display information reflected from the inner surface of the case toward the reflector is shielded by the light guide member. Also, the light emitting surface of the light guide member is inclined to be closer to the inner surface of the case toward the reflector from the display source. With this configuration, the light emitting surface faces the reflector in a direction opposite to the display source, and therefore the display light of the display information is prevented from being reflected by the light emitting surface.

Advantageous Effects of Invention

According to the first aspect of the present invention, the position of the virtual images of the guide light by the luminous bodies travels in the vertical direction together with the position of the virtual image of the display information. Also, the amount of travel of the virtual images of the guide light when the reflector is displaced is smaller than the amount of travel of the virtual image of the display information. Therefore, even if the virtual image of the display information falls outside the projection area, the virtual images of the guide light remain in the projection area, and is displayed. For that reason, it can be easily determined whether the virtual image of the display information is located above or below the projection area, according to the position at which the virtual images of the guide light are displayed or the direction of the guide light, and the position of the display information can be vertically adjusted with precision. Also, the virtual images of the guide light are displayed (visually recognized) closer to the driver than the virtual image of the display information. Therefore, the virtual images of the guide light and the virtual image of the display information are visually recognized at the same time, thereby enabling the sense of distance to be achieved. Also, since the luminous bodies are disposed within the case, the device can be prevented from being upsized. Also, the device can be configured inexpensively without requiring a complicated mechanism.

According to the second aspect of the present invention, when the virtual image of the display information is displayed on the projection area so as to face the front of the driver, the virtual images of the guide light become horizontal. That is, when the virtual image of the display information is correctly displayed, the virtual images of the guide light become horizontal. For that reason, it can be determined whether the virtual image of the display information is located at a correct position, or not, according to whether the virtual images of the guide light are horizontal, or not, and the position of the virtual image of the display information can be easily adjusted.

According to the third aspect of the present invention, the virtual display of the guide light can travel along the visual recognition direction of the driver, that is, along a direction from the near side of the driver toward the back side, or a direction opposite thereto (front-back direction of vehicle). Therefore, the driver's attention can be drawn to the display of the HUD device, and a depth sense can be created in the visual recognition direction of the driver.

According to the fourth aspect of the present invention, since the virtual images of the guide light are largely displayed, the visibility of the guide light can be improved. Also, the display light of the display information reflected from the inner surface of the case toward the reflector is shielded by the light guide member. Also, the display light of the display information is prevented from being reflected by the light emitting surface. As a result, a ghost (dual display) of the virtual image of the display information, and the deterioration of a contrast of the virtual image by lightening the interior of the case are prevented, thereby enabling the visibility of the display information to be improved.

BRIEF DESCRIPTION OF DRAWINGS

FIG. 1 is a cross-sectional view illustrating a configuration of a head-up display (HUD) device according to a first embodiment of the present invention.

FIG. 2 is a perspective view illustrating a neighborhood of a dashboard of a vehicle in which the HUD device of FIG. 1 is equipped.

FIG. 3 is a perspective view illustrating a state in which an upper wall is removed from a case of the HUD device.

FIG. 4 is a diagram schematically illustrating a layout of a virtual image displayed by the HUD device of FIG. 1, in which

FIG. 5 is a front view schematically illustrating a layout of the virtual image, in which

FIG. 6 is a diagram schematically illustrating modified examples of the layout of the virtual images of the guide light displayed by a plurality of luminous bodies in the HUD device of FIG. 1, in which

FIG. 7 is a front view schematically illustrating a state displayed by the HUD device of FIG. 1, in which

FIG. 8 is a diagram schematically illustrating an operation example of a first light emission control for the virtual images of the guide light displayed by the HUD device of FIG. 1, in which FIGS. 8(a) to 8(d) are front views schematically illustrating one process of the operation of the first light emission control for the virtual images of the guide light displayed by the HUD device of FIG. 1.

FIG. 9 is a front view schematically illustrating an operation example of a second light emission control for the virtual images of the guide light displayed by the HUD device of FIG. 1, in which FIGS. 9(a) to 9(d) are front views schematically illustrating one process of the operation of the second light emission control for the virtual images of the guide light displayed by the HUD device of FIG. 1.

FIG. 10 is a front view schematically illustrating the layout of the virtual image when the virtual images of the guide light displayed by the HUD device of FIG. 1 are used for a route guidance.

FIG. 11 is a front view schematically illustrating the operation example of a light emission control for lighting up in the order from one end to the other end in order to use the virtual images of the guide light of FIG. 10 for the route guidance, in which FIGS. 11(a) to 11(e) are front views schematically illustrating a process of the operation of the light emission control for lighting up in the order from one end to the other end in order to use the virtual images of the guide light of FIG. 10 for the route guidance.

Figure 13:
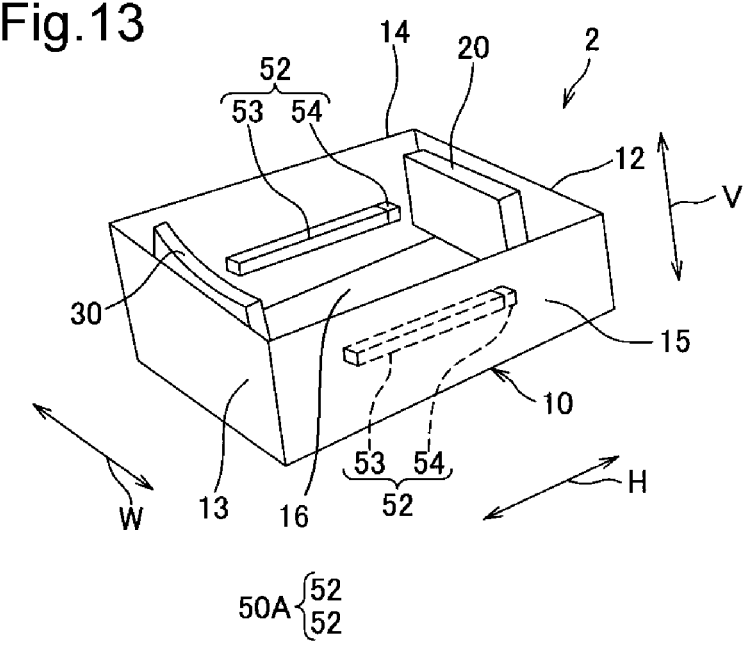
FIG. 13 is a perspective view illustrating a configuration of a head-up display (HUD) device according to a second embodiment of the present invention, in a state where the upper wall is removed from the case.

are perspective views illustrating configurations of the first to third modified examples of the luminous body in FIG. 13.

Figure 16:
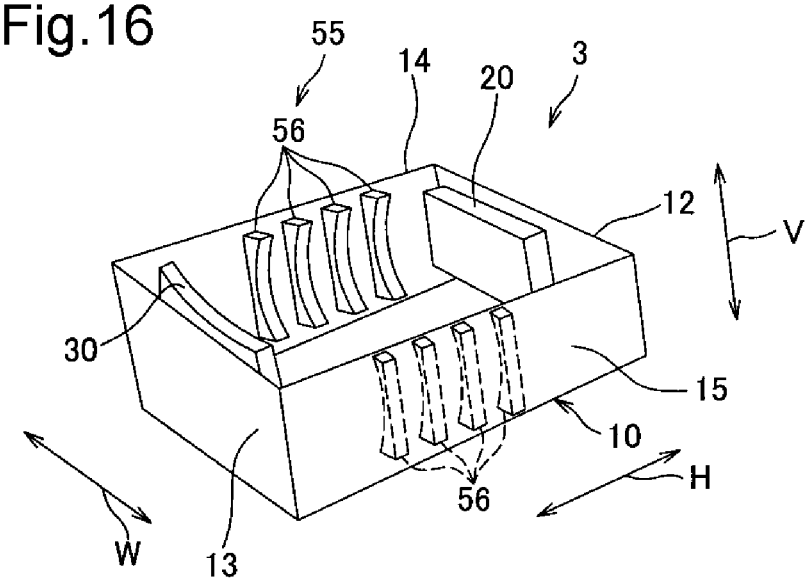

FIG. 16 is a perspective view illustrating a configuration of a head-up display (HUD) device according to a third embodiment of the present invention, in a state where the upper wall is removed from the case.

Figure 17:
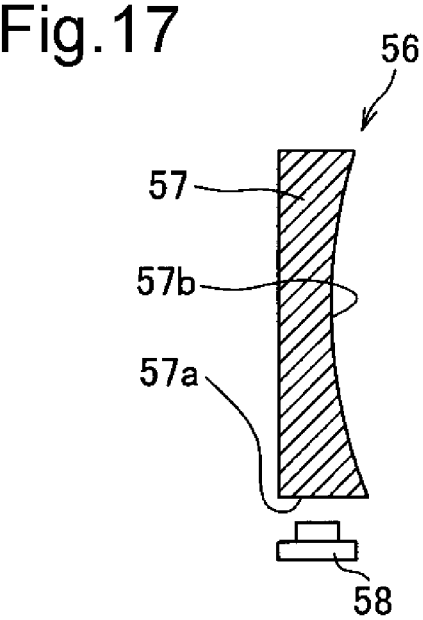

FIG. 17 is a cross-sectional view illustrating a configuration of a luminous body provided in the HUD device of FIG. 16.

FIG. 18 is a diagram illustrating a light guide member provided in the luminous body of FIG. 17, in which FIG. 18(a) is a perspective view illustrating the light guide member provided in the luminous body of FIG. 17, and FIG. 18(b) is a cross-sectional view taken along a line X-X of FIG. 18(a).

FIG. 19 is a front view schematically illustrating the layout of the virtual image displayed by the HUD device of FIG. 16.

FIG. 20 is a plan view schematically illustrating courses of the display light, in which FIG. 20(a) is a plan view schematically illustrating the courses of the display light in a configuration where inner surfaces of a pair of side walls of the case are planar, FIG. 20(b) is a plan view schematically illustrating the courses of the display light in a configuration where reflection prevention walls are provided on the inner surfaces of the pair of side walls of the case, and FIG. 20(c) is a plan view schematically illustrating the courses of the display light in a configuration of the HUD device in FIG. 16.

FIG. 21 is a cross-sectional view illustrating a configuration of the luminous body provided in the HUD device of FIG. 16, in which FIGS. 21(a) to 21(c) are cross-sectional views illustrating configurations of the first to third modified examples of the luminous body provided in the HUD device of FIG. 16.

FIG. 22 is a cross-sectional view illustrating a configuration in which lengths of the light guide members of the plurality of luminous bodies provided in the HUD device of FIG. 16 are different from each other.

Figure 23:
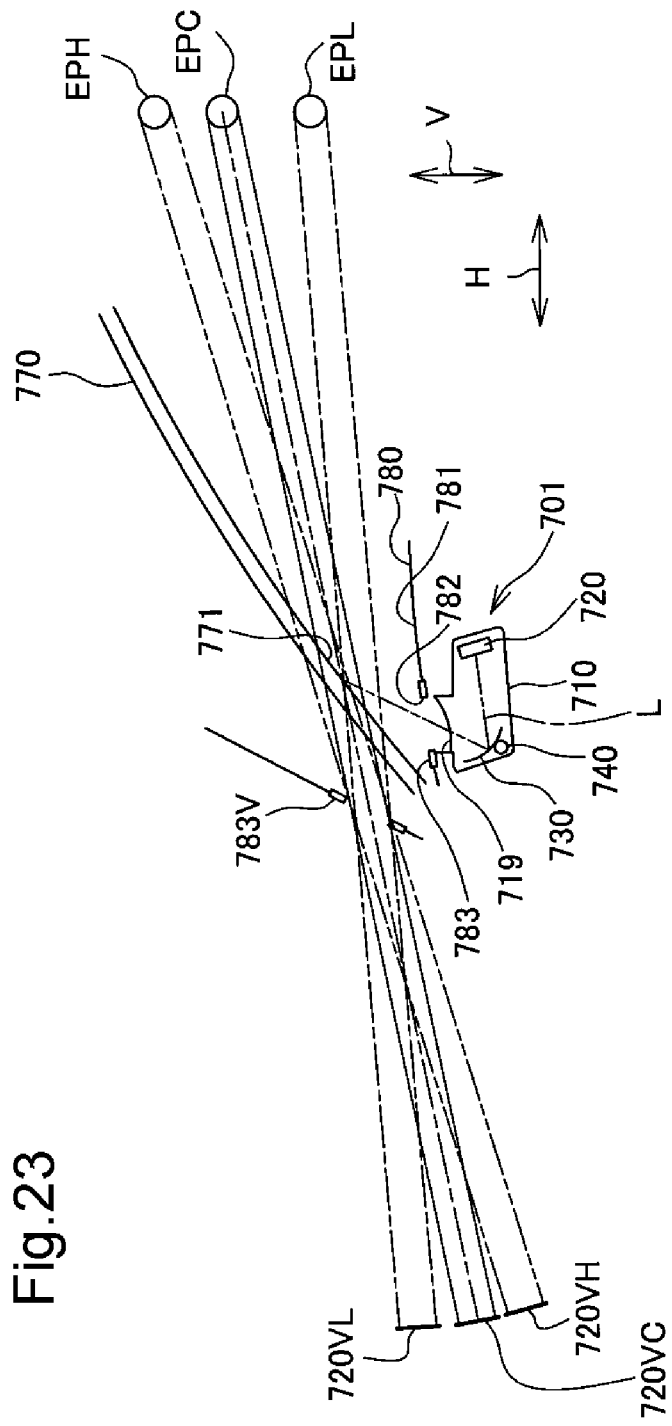

FIG. 23 is a cross-sectional view illustrating a configuration of a conventional head-up display device.

Figure 24:
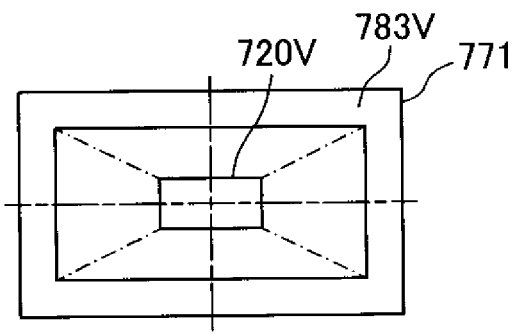
Figure 24:
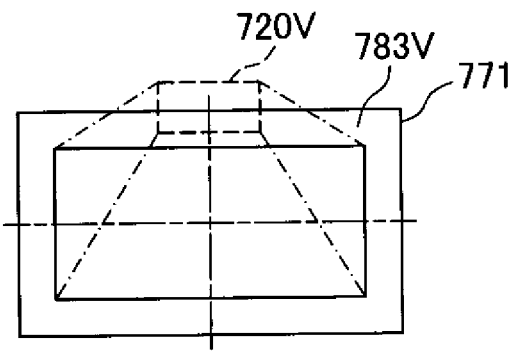
Figure 24:
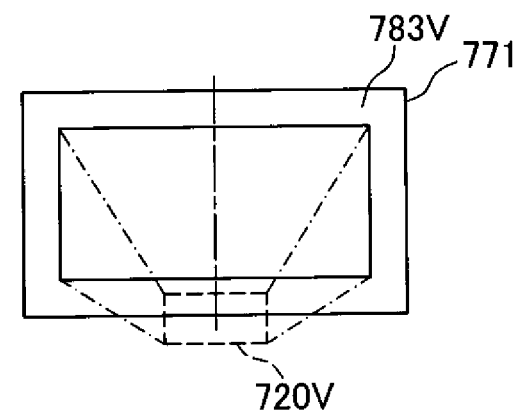

FIG. 24 is a front view schematically illustrating the layout of the virtual image, in which FIG. 24(a) is a front view schematically illustrating the layout of the virtual image when the virtual image displayed by the HUD device of FIG. 23 is so adjusted in position as to be correctly visually recognized by the driver, FIG. 24(b) is a front view schematically illustrating the layout of the virtual image when the driver with the high seating height gets on the vehicle in a state where the position of the virtual image is adjusted for a driver with a standard seating height, and FIG. 24(c) is a front view schematically illustrating the layout of the virtual image when the driver with the low seating height gets on the vehicle in the state where the position of the virtual image is adjusted for the driver with the standard seating height.

DESCRIPTION OF EMBODIMENTS

First Embodiment

Hereinafter, a head-up display device according to a first embodiment of the present invention will be described with reference to FIGS. 1 to 15(c).

As illustrated in FIG. 1, a head-up display (HUD) device 1 includes a case 10, a display source 20, a reflector 30, a driver 40 as a reflector displacement unit, a guide light unit 50, a controller 60, and an operating unit not shown. The HUD device 1 is equipped within a dashboard 80 facing a window shield (window shield glass) 70 of the vehicle.

The window shield 70 is provided with a rectangular projection area 71. To the projection area 71 are projected a light emitted by an opening bezel 83 that will be described later, a display light L of the display source 20, which will be described later, provided in the HUD device 1, and a guide light of the guide light unit 50.

As illustrated in FIGS. 1 and 2, the dashboard 80 has a slit-like opening 82, which extends in a vehicle width direction W, formed in an upper surface 81 facing the window shield 70. Also, the upper surface 81 of the dashboard 80 has an opening bezel 83 formed along an edge of the opening 82.

The opening bezel 83 includes a light guide member formed in a square frame and made of a transparent resin, and a light source such as a light emitting diode. The opening bezel 83 guides a light of the light source by the light guide member, and projects the light so as to coincide with an outer edge of the projection area 71, to thereby display a virtual image 83V of the opening bezel 83 in the projection area 71. In the present invention, the opening bezel 83 may not be configured to emit a light, or no opening bezel 83 may be provided.

The case 10 is formed of, for example, a non-translucent synthetic resin member or a metal member into a substantially cuboidal box shape. An opening 19 for outputting the display light L of the display source 20, which will be described later, toward the window shield 70 of the vehicle is disposed in a portion of an upper wall 11 of the case 10 closer to the front side of the vehicle. The opening 19 is formed with a shape (substantially rectangle) and size corresponding to a display surface 20a of the display source 20. The opening 19 is covered with a front cover 18 made of a transparent synthetic resin along that shape. The case 10 is arranged within the dashboard 80, and the opening 19 is put on the opening 82 of the dashboard 80.

The display source 20 is formed of a panel-shaped light-emitting device (for example, FE (field emission) display, a fluorescent display, an EL (electroluminescence) display), or a liquid crystal display with a backlight. As illustrated in FIG. 3, the display source 20 is put on an inner surface of a rear wall 12 of the case 10 closer to a rear side of the vehicle (closer to the driver), and the display surface 20a faces the front side of the vehicle. Also, the display source 20 is disposed in the center of the inner surface of the rear wall 12 in a vertical direction V of the vehicle and in the center thereof in a width direction W of the vehicle. That is, the display source 20 is fixed within the case 10. The display source 20 displays the display information requested by the control of the controller 60 which will be described to output a display light L of the display information from the display surface 20a. As an example, the display information includes arbitrary data such as image data, guidance data, or mark data.

The reflector 30 is formed of a reflection mirror or a magnifying mirror, and arranged on an inner surface of a front wall 13 of the case 10 closer to the front side of the vehicle so that a reflection surface 30a thereof faces the rear side of the vehicle. That is, the display source 20 and the reflector 30 are so arranged as to face each other along a longitudinal direction H of the vehicle. The reflector 30 is pivotally supported by a rotating shaft 30b disposed in parallel to the width direction W of the vehicle so as to be rotatable. The reflector 30 rotates about the rotating shaft 30b so that a direction of the reflection surface 30a can change within a range from the rear side of the vehicle to the upper side of the vehicle. That is, the reflector 30 can be displaced within the case 10.

The reflector 30 reflects the display light L of the display information displayed in the display source 20 toward the projection area 71 provided in the window shield 70 of the vehicle through the opening 19 of the case 10. As a result, the display light L is projected to the projection area 71, and a virtual image 20V of the display information is displayed at the projection position. Also, when the reflector 30 rotates about the rotating shaft 30b to change the direction of the reflection surface 30a, a reflection angle of the display light L is changed. As a result, the virtual image 20V of the display information travels in the vertical direction V of the vehicle according to the reflection angle of the display light L. In this embodiment, a case in which one reflector 30 is provided is described. However, the present invention is not limited to this configuration, and can be applied to various embodiments such that a plurality of reflectors 30 are provided to reflect the display light L by plural times.

The driver 40 includes a motor not shown connected to the controller 60, and a gear mechanism not shown which transmits a power of the motor to the reflector 30. The motor and the gear mechanism of the driver 40 are accommodated in the case 10. In the driver 40, the motor rotates on the basis of a control signal transmitted from the controller 60, and the gear mechanism transmits the rotating force of the motor to the reflector 30 and rotates the reflector 30 about the rotating shaft 30b.

In this embodiment, the reflector 30 is pivotally supported by the rotating shaft 30b, and the driver 40 rotates the reflector 30 about the rotating shaft 30b. However, the present invention is not limited to those configurations. For example, those configurations are arbitrary if the direction of the reflection surface 30a of the reflector 30 is changed, that is, the reflector 30 is displaced to move the virtual image 20V of the display information in the vertical direction V of the vehicle such that the reflector 30 is movable on a given arcuate orbit, and the driver 40 moves the reflector 30 along the arcuate orbit.

The guide light unit 50 includes a plurality of luminous bodies 51. The plurality of luminous bodies 51 are formed of, for example, known bullet-shaped light emitting diodes (LED). As illustrated in FIG. 3, the plurality of luminous bodies 51 are embedded in a pair of side walls 14 and 15 of the case 10, which face each other in the width direction W of the vehicle, so that tips of the bullet-shaped light emitting diodes are protruded from the inner surfaces of the respective side walls. In this embodiment, the vehicle width direction W coincides with a horizontal direction to the direction of the display information displayed in the display source 20 (that is, horizontal direction of the display source 20). Also, in this embodiment, the plurality of luminous bodies 51 includes eight luminous bodies 51 disposed on the respective side walls 14 and 15 4 by 4. It is needless to say that the number of luminous bodies 51 is not limited to eight.

The plurality of luminous bodies 51 are arranged in the center portions (that is, the same level as that of the center of the display source 20 in the vehicle vertical direction V) of the pair of side walls 14 and 15 in the vehicle vertical direction V, in parallel to a direction extending from the display source 20 to the reflector 30 (that is, optical path of the display light L, the vehicle longitudinal direction H). Hereinafter, when the respective luminous bodies 51, or virtual images 51V of the guide lights, which will be described later, are designated, individually, those luminous bodies or the virtual images are denoted by symbols a, b, c, and d, in the order from one end closest to the reflector 30 toward the other end. The plurality of luminous bodies 51 are coupled to the controller 60, and the respective luminous bodies 51 turn on or off at the same time according to a control signal transmitted from the controller 60. As an example of the control, the plurality of luminous bodies 51 turns on or off simultaneously in time with the display or display erase of the virtual image 20V of the display information. That is, the light emission of the plurality of luminous bodies 51 is controlled by the controller 60.

The light emitted from the plurality of luminous bodies 51 (hereinafter referred to as "guide light") is reflected by the reflector 30 toward the projection area 71 provided in the window shield 70 of the vehicle through the opening 19 of the case 10, as with the display light L of the display source 20. As a result, the guide light is projected to the projection area 71, and the virtual images 51V of the guide light are displayed on the projection positions. Also, when the reflector 30 rotates, the virtual images 51V of the guide light travel in the vertical direction V of the vehicle, with as the virtual image 20V of the display information.

Figure 4A:
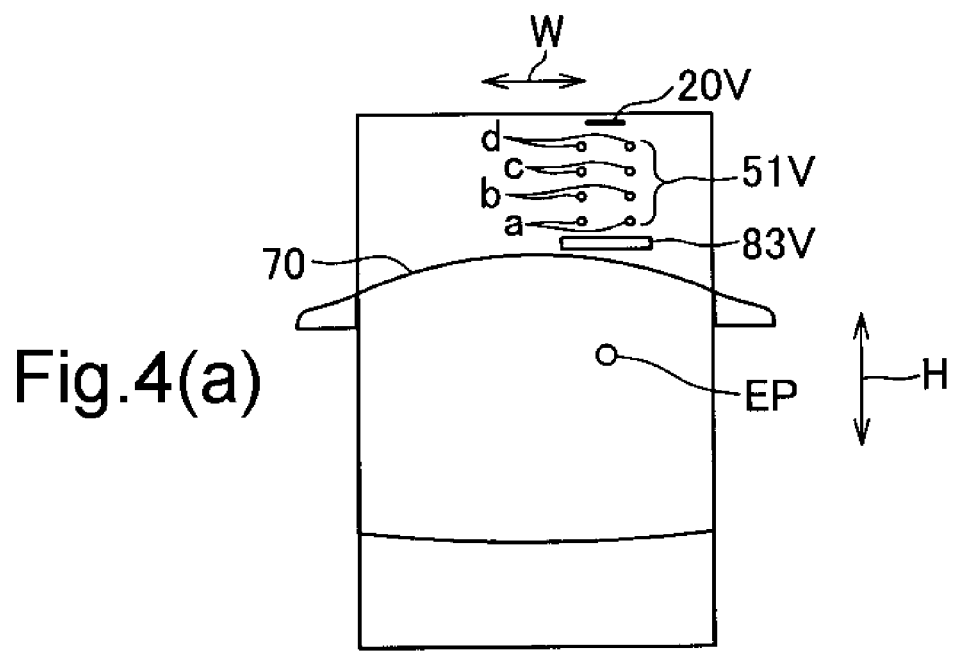
FIG. 4(a) is a plan view schematically illustrating the layout of the virtual image displayed by the HUD device of FIG. 1.
Figure 4B:
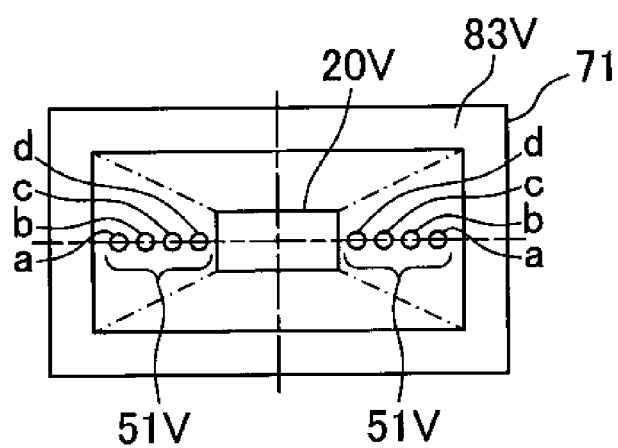
FIG. 4(b) is a front view schematically illustrating the layout of the virtual image displayed by the HUD device of FIG. 1.

A state in which the virtual image 20V of the above-mentioned display information, the virtual images 51V of the guide light, and the virtual image 83V of the opening bezel 83 are displayed in the projection area 71 is schematically illustrated in FIGS. 4(a) and 4(b). The virtual image 83V of the opening bezel 83 is displayed along the outer edge of the projection area 71. The virtual images 51V of the guide light and the virtual image 20V of the display information are displayed inside of the virtual image 83V of the opening bezel 83. The virtual images 51V of the guide light are so displayed as to be disposed at a distance from each other in the vehicle width direction W and in two lines along the vehicle longitudinal direction H. The virtual images 51V of the guide light are also so displayed as to face each other with the virtual image 20V of the display information interposed between the lines. Also, the virtual image 83V of the opening bezel 83 is displayed at a side closest to the driver, and the virtual images 51V of the guide light are displayed in the order (order of a, b, c, and d) from one end of the reflector 30 toward the other end in the back of the virtual image 83V. Further, the virtual image 20V of the display information is displayed in the back of the virtual images 51V.

Since the plurality of luminous bodies 51 are arranged closer to the reflector 30 than the display source 20, the virtual images 51V of the guide light are displayed on the side closer to the driver than the virtual image 20V of the display information. Also, when the reflector 30 rotates, the amount of travel of the virtual images 51V of the guide light is smaller than the amount of travel of the virtual image 20V of the display information. Also, the virtual images 51V of the guide light are displayed on the side closer to the driver as the virtual images 51V approach the reflector 30 more, and the amount of travel of the virtual images 51V when the reflector 30 rotates becomes smaller. That is, the virtual images 51V of the guide light are arranged in the order of a, b, c, and d from the side closest to the driver, and the amount of travel of those images satisfies the order of a<b<c<d.

The controller 60 is configured by a microcomputer including a CPU (central processing unit), a ROM (read only memory), and a RAM (random access memory) which are known. The ROM stores various data such as a rotation control processing program for controlling a rotating direction and a rotating amount of the above-mentioned reflector 30, and a light emission control processing program for the luminous bodies 51 of the guide light unit 50 therein. With execution of those programs, the CPU (that is, controller 60) functions as various units such as the rotation control unit and the light emission control unit. In the RAM is appropriately stored data necessary when the CPU executes various processing.

An operation unit not shown is electrically connected to the controller 60, and has a plurality of operation switches (not shown) for allowing the driver to select, for example, a rotating direction and the rotation amount of the reflector 30 (that is, a direction of travel and the mount of travel of the projection position of the display light L in the vehicle vertical direction V). The operation unit outputs an operation signal corresponding to the operation of the operation switch to the controller 60. The controller 60 transmits the control signal to the driver 40 according to the operation signal. The operation unit is disposed on a front panel facing the driver in the dashboard 80 so as to be operable by the driver.

The above-mentioned HUD device 1 reflects the display light L output from the display surface 20a of the display source 20 and the guide light emitted by the plurality of luminous bodies 51 in the guide light unit 50 toward the projection area 71 of the window shield 70 through the opening 19 of the case 10 by the reflector 30. Then, the display light L and the guide light projected to the projection area 71 are displayed as the virtual image 20V of the display information and the virtual images 51V of the guide light, respectively, and those virtual images and the foreground of the vehicle visually recognized through the window shield 70 are visually recognized in a superimposed manner by the driver.

Also, even if an eye position EP of the driver falls outside the eye range, the HUD device 1 moves the positions of the virtual image 20V of the display information and the virtual images 51V of the guide light in the vehicle vertical direction V to adjust the positions of the respective virtual images, thereby enabling the driver to virtually recognize the virtual image 20V and the virtual images 51V.

Subsequently, a description will be given of the operation (action) of the head-up display device according to the above-mentioned first embodiment of the present invention with reference to FIGS. 5(a) to 5(c).

Figure 5A:
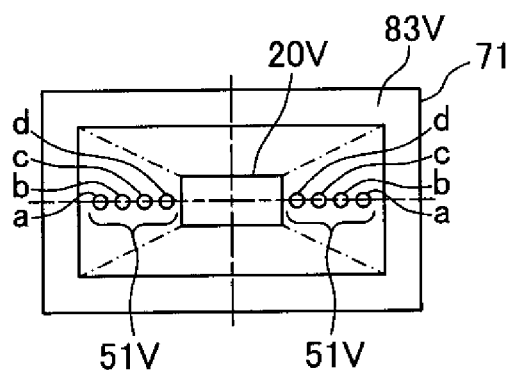
FIG. 5(a) is a front view schematically illustrating the layout of the virtual image when the virtual image displayed by the HUD device of FIG. 1 is so adjusted in position as to be correctly visually recognized by a driver.

When the virtual image 20V of the display information of the display source 20 is so adjusted in position as to be correctly visually recognized by the driver, as illustrated in FIG. 5(a), the virtual image 20V of the display information is displayed in the center of the inside of the virtual image 83V of the opening bezel. The virtual images 51V of the guide light in two lines are so displayed as to face each other in the vehicle width direction W so as to interpose the virtual image 20V of the display information therebetween. In this situation, the virtual images 51V of the guide light are displayed in parallel (that is, horizontally) to the vehicle width direction W.

Figure 5B:
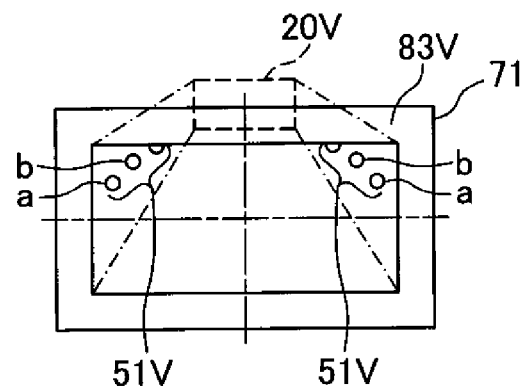
FIG. 5(b) is a front view schematically illustrating the layout of the virtual image when a driver with a high seating height gets on the vehicle in a state where the position of the virtual image is adjusted for the driver with the high seating height.

Also, when the driver with the high seating height gets on the vehicle in a state where the position of the virtual image of the display information is adjusted for the driver with the standard seating height, the display light L falls outside the eye range of the driver, and as illustrated in FIG. 5(b), the virtual image 20V of the display information is located above the virtual image 83V of the opening bezel, and the virtual image 20V of the display information is not displayed (cannot be visually recognized from driver). However, even in this case, one end portions (a, b) of the virtual images 51V of the guide light closer to the driver are displayed at an upper side within the virtual image 83V of the opening bezel, and further displayed gradually upward as the virtual images 51V of the guide light travel from the near side toward the back side (that is, virtual images 51V of the guide light are directed upward). Therefore, the driver can recognize that the virtual image 20V of the display information is located above the virtual image 83V (that is, projection area 71) of the opening bezel.

Figure 5C:
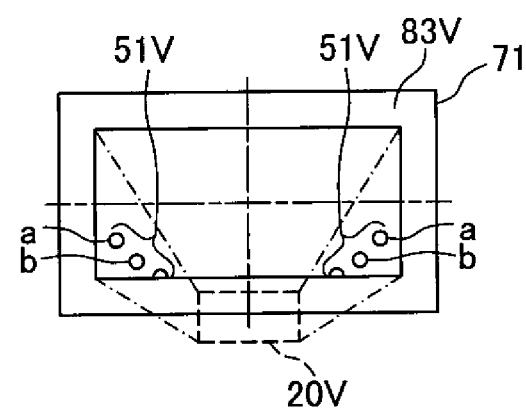
FIG. 5(c) is a front view schematically illustrating the layout of the virtual image when a driver with a low seating height gets on the vehicle in a state where the position of the virtual image is adjusted for the driver with the low seating height.

Also, when the driver with the low seating height gets on the vehicle in a state where the position of the virtual image of the display information is adjusted for the driver with the standard seating height, the display light L falls outside the eye range of the driver, and as illustrated in FIG. 5(c), the virtual image 20V of the display information is located below the virtual image 83V of the opening bezel, and the virtual image 20V of the display information is not displayed (cannot be visually recognized from driver). However, even in this case, one end portions (a, b) of the virtual images 51V of the guide light closer to the driver are displayed at a lower side within the virtual image 83V of the opening bezel, and further displayed gradually downward as the virtual images 51V of the guide light travel from the near side toward the back side (that is, virtual images 51V of guide light is directed downward). Therefore, the driver can recognize that the virtual image 20V of the display information is located below the virtual image 83V (that is, projection area 71) of the opening bezel.

Thus, according to this embodiment, the guide light unit 50 is equipped with the plurality of luminous bodies 51 arranged along the optical path of the display light L, on the inner surfaces of the pair of side walls 14 and 15 between the display source 20 and the reflector 30 in the case 10. Therefore, the guide light emitted by the luminous bodies 51 is reflected by the reflector 30 and projected to the projection area 71 together with the display light L of the display source 20. For that reason, when the reflector 30 rotates by the driver 40, the projection position of the guide light (that is, position of virtual images 51V of guide light) travels in the vehicle vertical direction V together with the projection position of the display light L of the display source 20 (that is, position of virtual image 20V of display information). Also, the plurality of luminous bodies 51 are arranged closer to the driver than the virtual image 20V of the display information, and the amount of travel of the virtual images 51V of the guide light when the reflector 30 rotates becomes smaller than the amount of travel of the virtual image 20V of the display information. Also, the amount of travel of the virtual images 51V of the guide light on one end a closest to the driver becomes smaller than the amount of travel of the other end d farthest from the driver (that is, closer to the virtual image 20V of the display information).

Also, the plurality of luminous bodies 51 is disposed in parallel to the optical path of the display light L on the inner surfaces of the pair of side walls 14 and 15 facing each other in the horizontal direction of the display source 20 in the case 10. Therefore, when the virtual image 20V of the display information is displayed in the projection area 71 facing the front of the driver, the virtual images 51V of the guide light become horizontal.

As described above, according to the present invention, the positions of the virtual images 51V of the guide light of the plurality of luminous bodies 51 travel in the vehicle vertical direction V together with the position of the virtual image 20V of the display information. Also, the amount of travel of the virtual images 51V of the guide light when the reflector 30 rotates is smaller than the amount of travel of the virtual image 20V of the display information. As a result, even if the virtual image 20V of the display information falls outside the projection area 71, the virtual images 51V of the guide light remain in the projection area 71 and are displayed. For that reason, it can be easily determined whether the virtual image 20V of the display information is located above or below the projection area 71 according to the position (that is, upper side or lower side) at which the virtual images 51V of the guide light are displayed and the direction (that is, direction from one end toward the other end) thereof. The position of the virtual image 20V of the display information in the vehicle vertical direction V can be adjusted with precision. Also, since the virtual images 51V of the guide light are displayed closer to the driver (near side) than the virtual image 20V of the display information, the virtual images 51V of the guide light and the virtual image 20V of the display information can be visually recognized at the same time, thereby enabling a sense of the distance to be achieved. Also, since the plurality of luminous bodies 51 is disposed within the case 10, the HUD device 1 can be prevented from being upsized. Also, the HUD device 1 can be configured inexpensively without requiring a complicated mechanism.

Also, when the virtual image 20V of the display information is displayed in the projection area 71 so as to face the front of the driver, the virtual images 51V of the guide light become horizontal. That is, when the virtual image 20V of the display information is correctly displayed, the virtual images 51V of the guide light become horizontal. For that reason, it can be determined whether the virtual image 20V of the display information is located at a correct position, or not, according to whether the virtual images 51V of the guide light are horizontal, or not, and the position of the virtual image 20V of the display information can be easily adjusted.

Figure 6A:
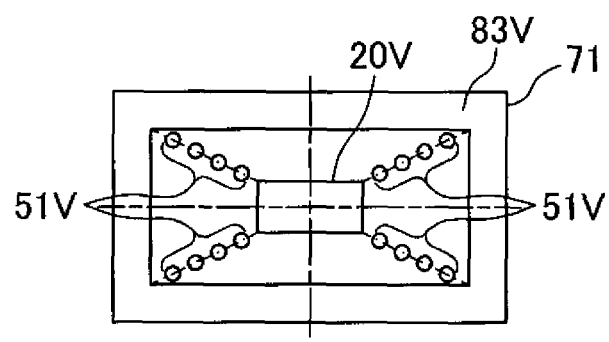
FIGS. 6(a) to 6(c) are front views schematically illustrating first to third modified examples of the virtual images of the guide light displayed by the plurality of luminous bodies in the HUD device of FIG. 1.
Figure 6B:
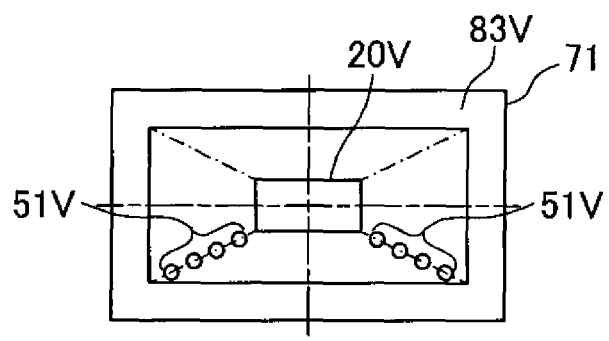
Figure 6C:
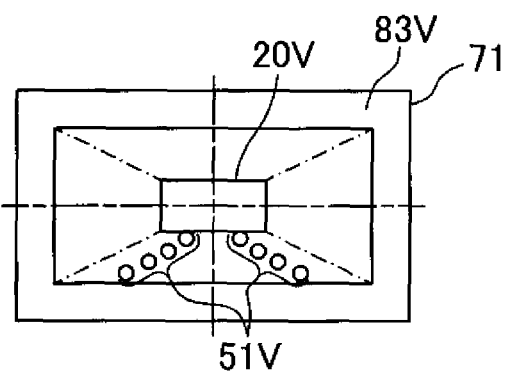

In this embodiment, the plurality of luminous bodies 51 is arranged in parallel to the vehicle longitudinal direction H (that is, optical path of display light L) at a distance from each other, in the center of the vehicle vertical direction V on the inner surfaces of the pair of side walls 14 and 15 in the vehicle vertical direction V. However, the present invention is not limited to this configuration. The plurality of luminous bodies 51 may be, for example, (1) arranged inside of four sides of the case 10 along the vehicle longitudinal direction H, (2) arranged inside of two sides contacting with a lower wall 16 among the four sides along the vehicle longitudinal direction H in the case 10, or (3) arranged in two lines in parallel to the vehicle longitudinal direction H on the inner surface of the lower wall 16 of the case 10. Examples of the virtual display in those configurations (1) to (3) are illustrated in FIGS. 6(a) to 6(c), respectively.

Figure 7A:
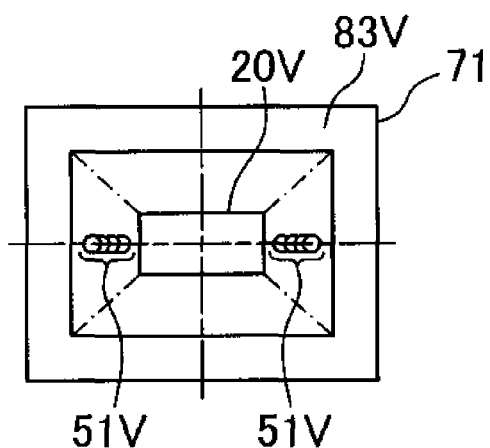
FIG. 7(a) is a front view schematically illustrating a state in which the superimposed virtual images of the guide light are displayed by the HUD device of FIG. 1, and FIG. 7(b)
Figure 7B:
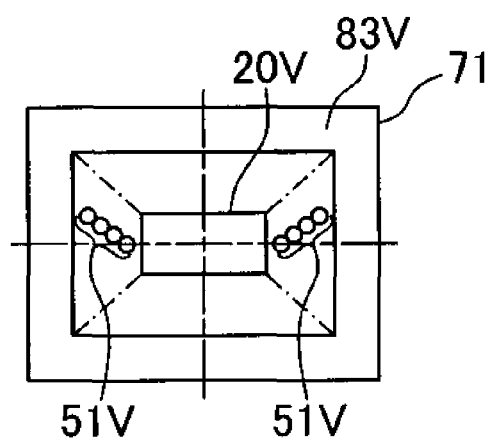
FIG. 7(b) is a front view schematically illustrating a state in which the virtual images of the guide light, which are displaced in a vertical direction of the vehicle, are displayed.
Figure 11:
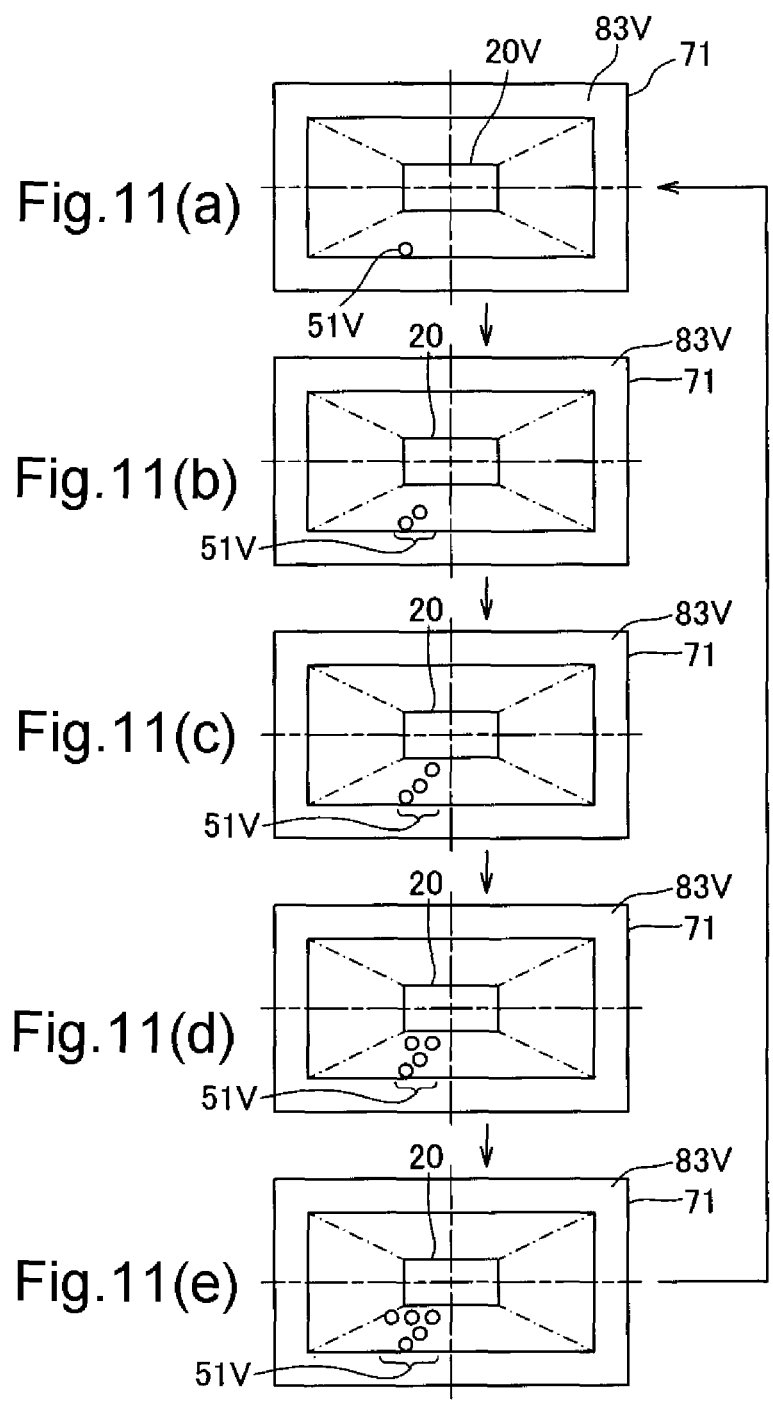
Figure 12:
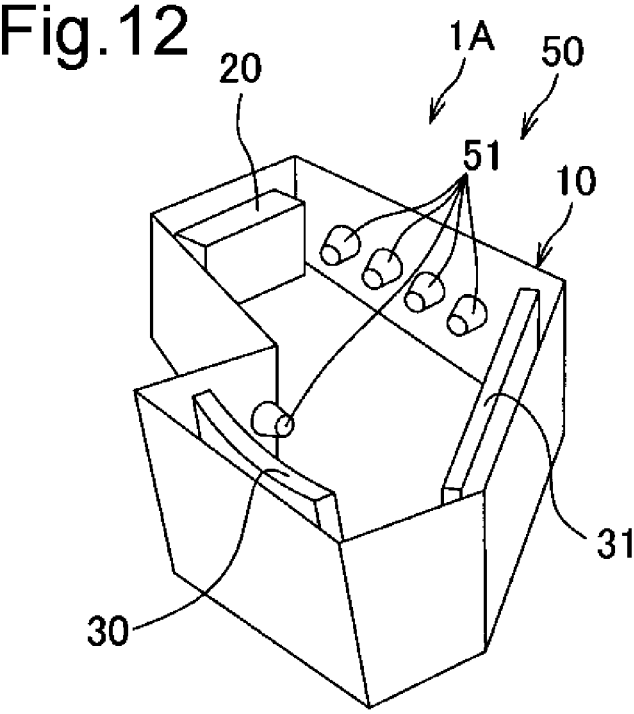
FIG. 12 is a perspective view illustrating a configuration of a modified example of the case of the HUD device in FIG. 1 in a state where the upper wall is removed from the case.

When a distance between the pair of side walls 14 and 15 cannot be sufficiently ensured or distances between the respective luminous bodies 51 cannot be sufficiently ensured such that the projection area 71 is small, or the case 10 is downsized, the virtual images 51V of the guide light may overlap with each other as illustrated in FIG. 7(a). In this case, the respective luminous bodies 51 may be arranged gradually downward in the vehicle vertical direction V from the display source 20 toward the reflector 30. With this arrangement, as illustrated in FIG. 7(b), the virtual images 51V of the guide light is prevented from overlapping with each other, as a result of which the visibility of the virtual images 51V of the guide light can be improved. In particular, it is preferable that the luminous bodies 51 of the guide light are displaced by a width of the luminous bodies 51 or more.

Thus, the plurality of luminous bodies 51 in the guide light unit 50 may be disposed on any inner surface of the upper wall 11, the lower wall 16, and the side walls 14, 15 of the case 10, that is, on the inner surface between the display source 20 and the reflector 30 in the case 10. Also, the plurality of luminous bodies 51 may be arranged along the optical path of the display light L, that is, in parallel to, or substantially in parallel to the optical path of the display light L within a range not contrary to the purpose of the present invention.

Also, in this embodiment, the plurality of luminous bodies 51 is controlled to turn on or off at the same time. However, the present invention is not limited to this configuration. For example, the plurality of luminous bodies 51 may be controlled by the controller 60 so as to conduct the following operations. That is, (1) the operation in which the plurality of luminous bodies 51 is sequentially turned on from one end (that is, a of luminous bodies 51) closest to the reflector 30 every given time (for example, 1 second), and after the plurality of luminous bodies 51 have been turned on to the other end (that is, d of luminous bodies 51) farthest from the reflector 30, all of the luminous bodies 51 are turned off, and the plurality of luminous bodies 51 are again sequentially turned on from one end in the same manner. (2) The operation in which the plurality of luminous bodies 51 is sequentially turned on from one end (that is, a of luminous bodies 51) closest to the reflector 30 every given time (for example, 1 second) while the luminous bodies 51 that have been previously turned on are turned off, and after the plurality of luminous bodies 51 have been turned on to the other end (that is, d of luminous bodies 51) farthest from the reflector 30, the plurality of luminous bodies 51 are again sequentially turned on from one end in the same manner. Examples of the virtual display in those operations (1) and (2) are illustrated in FIGS. 8(a) to 8(d) and 9(a) to 9(d). With execution of the above controls, the virtual images of the guide light can travel along the visual recognition direction (that is, vehicle longitudinal direction H) of the driver, the driver's attention can be drawn to the display of the HUD device 1, and a depth sense can be created in the visual recognition direction of the driver.

Also, the travel of the virtual images 51V of the guide light may be used for the route guidance by a navigation system. For example, the plurality of luminous bodies 51 is arranged in three lines (left, center, right) in parallel along the vehicle longitudinal direction H, on the inner surface of the lower wall 16 of the case 10. Further, the other end of the luminous bodies 51 in the two right and left lines on the display source 20 side are bent and extended in the horizontal direction along the vehicle width direction W. Then, the plurality of luminous bodies 51 arranged on the right or left side is sequentially turned on from one end of the reflector 30 side toward the other end according to a direction toward which the vehicle is turned. FIG. 10 illustrates display when all of the plurality of luminous bodies 51 are turned on, and FIGS. 11(a) to 11(e) illustrate examples of the display of the virtual images 51V of the guide light during the route guidance.

Also, in this embodiment, the case 10 is formed into a substantially rectangular box. However, the present invention is not limited to this configuration. For example, the case 10 may be formed into a truncated quadrangular pyramid formed so that a vertical cross-sectional area is gradually increased toward the front wall 13 from the rear wall 12 of the case 10, or a box L-shaped in a top view. An HUD device 1A illustrated in FIG. 12 includes a case 10A formed into a box L-shaped in the top view. In the HUD device 1A, a display source 20 is disposed on one end of the L-shape of the case 10A, a reflector 30 is disposed on the other end of the L-shape, an auxiliary reflector 31 that reflects the display light of the display source 20 toward the reflector 30 is disposed on a corner of the L-shape, and a guide light unit 50 (that is, the plurality of luminous bodies 51) is disposed on inner surfaces of side walls corresponding to a long side and a short side of the L-shape. Thus, the case shape and the configuration of the HUD device are arbitrary unless contrary to the purpose of the present invention.

Second Embodiment

Hereinafter, a head-up display device according to a second embodiment of the present invention will be described with reference to FIGS. 13 to 15(c).

As illustrated in FIG. 13, a head-up display device 2 includes the case 10, the display source 20, the reflector 30, the driver 40 as the reflector displacement unit, a guide light unit 50A, the controller 60, and the operating unit not shown.

As in the HUD device 1 of the above-mentioned first embodiment, the HUD device 2 is equipped within the dashboard 80 facing the window shield (window shield glass) 70 of the vehicle. In the second embodiment, the constituent elements other than the guide light unit 50A are identical with those in the above-mentioned first embodiment, and therefore those identical constituent elements are denoted by the same symbols, and their description will be omitted.

Figure 14:
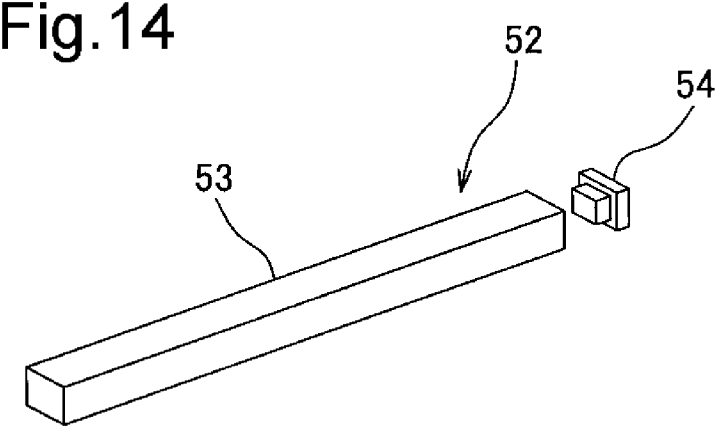
FIG. 14 is a perspective view illustrating a configuration of a luminous body provided in the HUD device of FIG. 13.

The guide light unit 50A includes a pair of luminous bodies 52. As illustrated in FIG. 14, each of the luminous bodies 52 includes a light guide member 53 formed into a prism (that is, bar) and made of a translucent resin containing a light diffusing material therein, and a light source 54 formed of a known surface mount light emitting diode, which inputs a light to a light entrance surface provided on one end of the light guide member 53.

As illustrated in FIG. 13, the light guide member 53 is disposed in parallel to a direction (that is, optical path of the display light L, vehicle longitudinal direction H) from the display source 20 toward the reflector 30, in the center of each inner surface of the pair of side walls 14 and 15 of the case 10 in the vehicle vertical direction V. The light guide member 53 may be formed into an elongated bar such as a prism or a cylinder, and arranged along the above direction, that is, in parallel to or substantially in parallel to the above direction to the extent not inconsistent with the purpose of the present invention.

Also, the light source 54 faces the light entrance surface of each light guide member 53 so as to input the light to one end of the light guide member 53, which is arranged closer to the display source 20, and is disposed on each of the pair of side walls 14 and 15. The light sources 54 of the luminous bodies 52 are connected to the controller 60, and turned on or off in time with the display or display erase of the virtual image 20V of the display information according to a control signal transmitted from the controller 60. When the light source 54 turns on and inputs the light to the light entrance surface, the light guide member 53 emits a light over all. Also, the luminous bodies 52 may be disposed on the inner surface of only one side wall, and disposed on any inner surface of the upper wall 11, the lower wall 16, and the side walls 14, 15 of the case 10, that is, on the inner surface between the display source 20 and the reflector 30 of the case 10.

According to this embodiment, the guide light unit 50A is equipped with the pair of luminous bodies 52 arranged along the optical path of the display light L, on the inner surfaces of the pair of side walls 14 and 15 between the display source 20 and the reflector 30 in the case 10. Therefore, the guide light emitted by the luminous bodies 52 is reflected by the reflector 30 and projected to the projection area 71 together with the display light L of the display source 20. For that reason, when the reflector 30 rotates by the driver 40, the projection position of the guide light (that is, position of virtual images (not shown) of guide light) travels in the vehicle vertical direction V together with the projection position of the display light L of the display source 20 (that is, position of virtual image 20V of display information). Also, since the pair of luminous bodies 52 is arranged closer to the reflector 30 than the display source 20, the virtual images of the guide light are displayed closer to the driver (near side) than the virtual image 20V of the display information. Also, the amount of travel of the virtual images of the guide light when the reflector 30 rotates becomes smaller than the amount of travel of the virtual image 20V of the display information. Also, the amount of travel of the virtual images of the guide light on one end closer to the driver becomes smaller than the amount of travel of the other end farther from the driver (that is, closer to the virtual image 20V of the display information). According to this embodiment, the virtual images of the guide light are displayed as a line into which the respective virtual images 51V of the guide light in the above-mentioned first embodiment are made consecutive, and also travel as with the virtual images 51V of the guide light.

Also, the pair of luminous bodies 52 is disposed in parallel to the optical path of the display light L on the inner surfaces of the pair of side walls 14 and 15 facing each other in the horizontal direction of the display source 20 in the case 10. Therefore, when the virtual image 20V of the display information is displayed in the projection area 71 facing the front of the driver, the virtual images of the guide light become horizontal.

As described above, according to the present invention, the positions of the virtual images of the guide light of the pair of luminous bodies 52 travel in the vehicle vertical direction V together with the position of the virtual image 20V of the display information. Also, the amount of travel of the virtual images of the guide light when the reflector 30 rotates is smaller than the amount of travel of the virtual image 20V of the display information. As a result, even if the virtual image 20V of the display information falls outside the projection area, the virtual images of the guide light remain in the projection area and are displayed. For that reason, it can be easily determined whether the virtual image 20V of the display information is located above or below the projection area 71 according to the position (that is, upper side or lower side) at which the virtual images of the guide light are displayed and the direction (that is, direction from one end toward the other end) thereof. The position of the virtual image 20V of the display information in the vehicle vertical direction V can be adjusted with precision. Also, since the virtual images of the guide light are displayed closer to the driver (near side) than the virtual image 20V of the display information, the virtual images of the guide light and the virtual image of the display information can be visually recognized at the same time, thereby enabling a sense of the distance to be achieved. Also, since the pair of luminous bodies 52 is disposed within the case 10, the HUD device 2 can be prevented from being upsized. Also, the HUD device 2 can be configured inexpensively without requiring a complicated mechanism.

Also, when the virtual image 20V of the display information is displayed in the projection area 71 so as to face the front of the driver, the virtual images of the guide light become horizontal. That is, when the virtual image 20V of the display information is correctly displayed, the virtual images of the guide light become horizontal. For that reason, it can be determined whether the virtual image 20V of the display information is located at a correct position, or not, according to whether the virtual images of the guide light are horizontal, or not, and the position of the virtual image 20V of the display information can be easily adjusted.

Figure 15A:
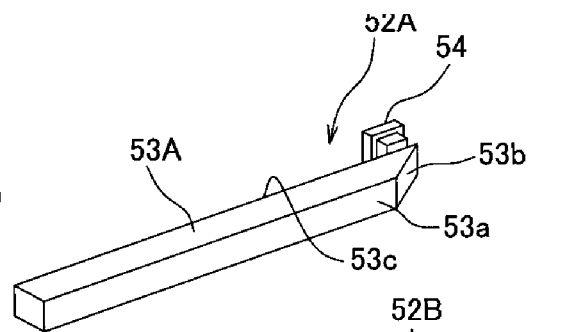
FIG. 15 is a perspective view illustrating a configuration of the luminous body in FIG. 13, in which FIGS. 15(a) to 15(c)
Figure 15B:
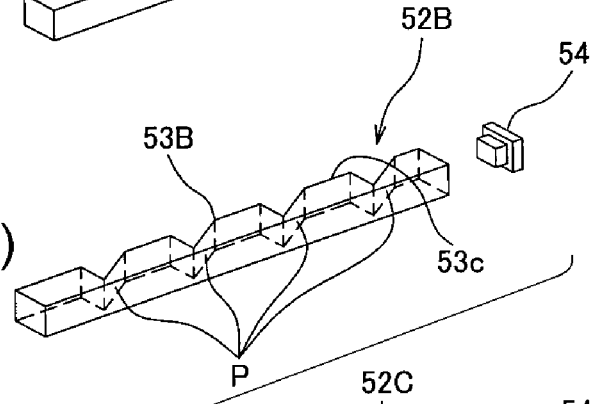
Figure 15C:
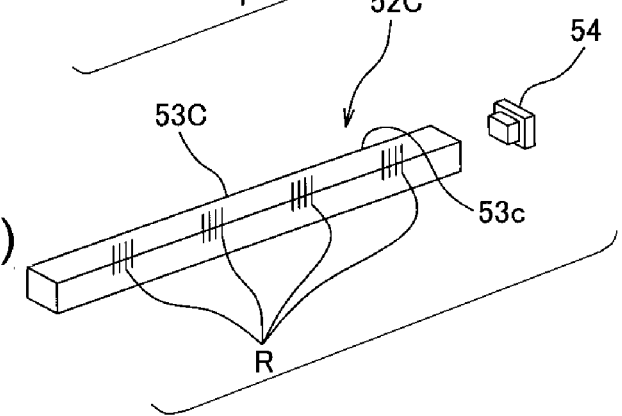

In this embodiment, in addition to the above-mentioned configuration, the luminous bodies 52 may be configured in such a manner that, for example, as with a luminous body 52A illustrated in FIG. 15(a), a front surface 53a of a light guide member 53A formed into a prism and made of a transparent synthetic resin, which faces the inside of the case 10, is provided with a total reflection surface 53b formed by obliquely notching one end of the front surface 53a. The light of the light source 54 may be input to one end of a back surface 53c put on the respective side walls of the light guide member 53A so that the light is totally reflected by the total reflection surface 53b. As another method, for example, as with a luminous body 52B illustrated in FIG. 15(b), a light guide member 53B formed into a prism and made of a transparent synthetic resin may be provided with a plurality of prism cut parts P formed by a wedge-shaped notch that becomes gradually deeper from one end toward the other end on the back surface 53c at a distance from each other in the longitudinal direction, so that the light of the light source 54 is reflected toward the inside of the case 10. As another method, as with a luminous body 52C illustrated in FIG. 15(c), a light guide member 53C formed into a prism and made of a transparent synthetic resin may be provided with diffused reflection processors R formed by diffused reflection processing on the back surface 53c at a distance from each other in the longitudinal direction, so that the light of the light source 54 is diffusedly reflected. As another method, the above-mentioned prism cut parts P or the diffused reflection processors R may be replaced by a configuration in which a plurality of light entrance surfaces is provided on the back surface of the light guide member, and a plurality of light sources is provided in correspondence with the respective light entrance surfaces. With use of the above luminous bodies 52B or 52C, unlike the linear virtual images of the guide light, as in the above-mentioned first embodiment, a plurality of virtual images of the guide light arranged at a distance from each other along the visual recognition direction is displayed.

Third Embodiment

Hereinafter, a head-up display device according to a third embodiment of the present invention will be described with reference to FIGS. 16 to 22.

As illustrated in FIG. 16, a head-up display device 3 includes the case 10, the display source 20, the reflector 30, the driver 40 as the reflector displacement unit, a guide light unit 55, the controller 60, and the operating unit not shown. As in the HUD device 1 of the above-mentioned first embodiment, the HUD device 3 is equipped within the dashboard 80 facing the window shield (window shield glass) 70 of the vehicle. In the third embodiment, the constituent elements other than the guide light unit 55 are identical with those in the above-mentioned first embodiment, and therefore those identical constituent elements are denoted by the same symbols, and their description will be omitted.

The guide light unit 55 includes a plurality of luminous bodies 56. As illustrated in FIG. 17, each of the plurality of luminous bodies 56 includes a prismatic light guide member 57 made of a transparent synthetic resin having one end provided with a planar light entrance surface 57a, and a light source 58 formed of a known surface mount light emitting diode, which inputs a light to the light entrance surface 57a the light guide member 57. The light guide members 57 are protruded from the inner surfaces of the pair of side walls 14 and 15 of the case 10 so that a longitudinal direction of the light guide member 57 (that is, in parallel to the vehicle vertical direction V) is orthogonal to a direction from the display source 20 to the reflector 30 (that is, optical path of the display light L, vehicle longitudinal direction H). The light guide member 57 guides the light of the light source 58 input to the light entrance surface 57a to a light emitting surface 57b facing the inside of the case 10, and outputs the light.

As illustrated in FIGS. 17 and 18(a), the light emitting surface 57b of the light guide member 57 is formed into an arcuate concave in longitudinal cross section. Also, as illustrated in FIG. 18(b), the light emitting surface 57b of the light guide member 57 is inclined to be closer to the side wall 14 or 15 of the case 10 toward an edge 57d of the reflector 30 side from an edge 57c of the display source 20 side. The longitudinal cross section of the light emitting surface 57b may be formed into a linear plane.

The plurality of luminous bodies 56 are arranged in the center portions of the pair of side walls 14 and 15 in the vehicle vertical direction V, along a direction extending from the display source 20 to the reflector 30 (that is, optical path of the display light L, the vehicle longitudinal direction H) at a distance from each other. In this embodiment, the plurality of luminous bodies 56 includes eight luminous bodies 56 disposed on the respective side walls 14 and 15 4 by 4. It is needless to say that the number of luminous bodies 56 is not limited to eight. The plurality of plurality of luminous bodies 56 (that is, light sources 58) are connected to the controller 60, and the respective luminous bodies 56 are turned on or off simultaneously in time with the display or display erase of the virtual image 20V of the display information according to a control signal transmitted from the controller 60. Also, as in FIGS. 8(a) to 8(d) and 9(a) to 9(d), the respective plurality of luminous bodies 56 may be turned on or off in order from the end. That is, the plurality of plurality of luminous bodies 56 is controlled to emit the light by the controller 60.

The light emitted from the plurality of luminous bodies 56 (that is, guide light) is reflected by the reflector 30 toward the projection area 71 provided in the window shield 70 of the vehicle through the opening 19 of the case 10, as with the display light L of the display source 20. As a result, the guide light is projected to the projection area 71, and the virtual images 56V of the guide light are displayed on the projection positions. Also, when the reflector 30 rotates, the virtual images 56V of the guide light travel in the vertical direction V of the vehicle, with as the virtual image 20V of the display information.

A state in which the virtual image 20V of the above-mentioned display information, the virtual images 56V of the guide light, and the virtual image 83V of the opening bezel 83 are displayed in the projection area 71 is schematically illustrated in FIG. 19. The virtual image 83V of the opening bezel 83 is displayed along the outer edge of the projection area 71. The virtual images 56V of the guide light and the virtual image 20V of the display information are displayed inside of the virtual image 83V of the opening bezel 83. The virtual images 56V of the guide light are so displayed as to be disposed at a distance from each other in the vehicle width direction W and in two lines along the vehicle longitudinal direction H. The virtual images 56V of the guide light are also so displayed as to face each other with the virtual image 20V of the display information interposed between the lines. Also, the virtual image 83V of the opening bezel 83 is displayed at a side closest to the driver, and the virtual images 56V of the guide light are displayed in the order from one end of the reflector 30 toward the other end in the back of the virtual image 83V. Further, the virtual image 20V of the display information is displayed in the back of the virtual images 56V.

Since the plurality of luminous bodies 56 are arranged closer to the reflector 30 than the display source 20, the virtual images 56V of the guide light are displayed on the side closer to the driver than the virtual image 20V of the display information. Also, when the reflector 30 rotates, the amount of travel of the virtual images 56V of the guide light is smaller than the amount of travel of the virtual image 20V of the display information. Also, the virtual images 56V of the guide light are displayed on the side closer to the driver as the virtual images 56V approach the reflector 30 more, and the amount of travel of the virtual images 56V when the reflector 30 rotates becomes smaller. Also, the plurality of luminous bodies 56 each emits the light from the light emitting surface 57b.

Subsequently, a description will be given of the operation (action) of the head-up display device according to the above-mentioned third embodiment of the present invention with reference to FIGS. 20(a) to 20(c).

FIG. 20(a) is a diagram schematically illustrating the courses of the display light L of the display source 20 in a configuration where the inner surfaces of the pair of side walls 14 and 15 of the case 10 are planar. In this case, the display light L is reflected by the inner surfaces of the side walls 14 and 15, and also reflected by the reflector 30, thereby being reflected by the projection area 71. As a result, a ghost (dual display) of the virtual image 20V of the display information, and the deterioration of a contrast of the virtual image 20V by lightening the interior of the case occur, thereby deteriorating the visibility of the display information.

FIG. 20(b) is a diagram schematically illustrating the courses of the display light L of the display source 20 in a configuration where a plurality of prismatic reflection prevention walls 17 is protruded such that a longitudinal direction thereof is orthogonal to a direction from the display source 20 toward the reflector 30 (that is, in parallel to vehicle vertical direction V), on the inner surfaces of the pair of side walls of the case. With this configuration, the display light L reflected from the inner surfaces of the side walls 14 and 15 toward the reflector 30 can be shielded by the reflection prevention walls 17. However, since the display light L is reflected by surfaces of the reflection prevention walls 17 facing the inside of the case 10, the deterioration of the visibility of the display information as described above cannot be sufficiently prevented.

FIG. 20(c) is a diagram schematically illustrating the courses of the display light L of the display source 20 in the configuration of the above-mentioned third embodiment. According to this configuration, the display light L reflected from the inner surfaces of the side walls 14 and 15 toward the reflector 30 can be shielded by the light guide members 57 of the plurality of luminous bodies 56. Also, the light emitting surfaces 57b of the light guide member 57, which face the inside of the case 10, are inclined to be closer to the inner surfaces of the pair of side walls 14 and 15 toward the reflector 30 from the display source 20. As a result, the visibility of the display information can be improved without reflection of the display light L by the light emitting surface 57b. Also, in addition to the above operation, the third embodiment has the same operation as that in the above-mentioned first embodiment.

As described above, according to this embodiment, the guide light unit 55 is equipped with the plurality of luminous bodies 56 arranged along the optical path of the display light L, on the inner surfaces of the pair of side walls 14 and 15 between the display source 20 and the reflector 30 in the case 10. Therefore, the guide light emitted by the luminous bodies 56 is reflected by the reflector 30 and projected to the projection area 71 together with the display light L of the display source 20. For that reason, when the reflector 30 rotates by the driver 40, the projection position of the guide light (that is, position of virtual images 56V of guide light) travels in the vehicle vertical direction V together with the projection position of the display light L of the display source 20 (that is, position of virtual image 20V of display information). Also, since the plurality of luminous bodies 56 is arranged closer to the reflector 30 than the display source 20, the virtual images 56V of the guide light are displayed closer to the driver (near side) than the virtual image 20V of the display information. Also, the amount of travel of the virtual images 56V of the guide light when the reflector 30 rotates becomes smaller than the amount of travel of the virtual image 20V of the display information. Also, the amount of travel of the virtual images 56V of the guide light on one end closer to the driver becomes smaller than the amount of travel of the other end farther from the driver (that is, closer to the virtual image 20V of the display information).

Also, the guide light unit 55 includes the plurality of luminous bodies 56, and the prismatic light guide members 57 that are formed to be protruded from the inner surfaces of the pair of side walls 14 and 15 of the case 10 so that the longitudinal direction of the light guide members 57 is orthogonal to the optical path of the display light L, and guides the light of the light source 58 to the light emitting surface 57b facing the inside of the case 10, and outputs the light. As a result, as compared with the case of the point-like luminous bodies, the virtual images 56V of the guide light are largely displayed. Also, the display light L reflected from the inner surfaces of the side walls 14 and 15 toward the reflector 30 can be shielded by the light guide members 57 of the plurality of luminous bodies 56. Also, the light emitting surfaces 57b of the light guide member 57 are inclined to be closer to the inner surfaces of the pair of side walls 14 and 15 toward the reflector 30 from the display source 20. Therefore, the light emitting surfaces 57b face the reflector 30 in the direction opposite to the display source 20, and for that reason, the display light L of the display source 20 is prevented from being reflected by the light emitting surface 57b.

As described above, according to the present invention, the position of the virtual images 56V of the guide light by the plurality of luminous bodies 56 travels in the vertical direction V together with the position of the virtual image 20V of the display information. Also, the amount of travel of the virtual images 56V of the guide light when the reflector 30 rotates is smaller than the amount of travel of the virtual image 20V of the display information. Therefore, even if the virtual image 20V of the display information falls outside the projection area 71, the virtual images 56V of the guide light remain in the projection area 71, and are displayed. For that reason, it can be easily determined whether the virtual image 20V of the display information is located above or below the projection area 71, according to the position at which the virtual images 56V of the guide light are displayed or the direction of the guide light (that is, a direction from one end toward the other end), and the position of the virtual image 20V of the display information in the vehicle vertical direction V can be adjusted with precision. Also, the virtual images 56V of the guide light are displayed closer to the driver than the virtual image 20V of the display information. Therefore, the virtual images 56V of the guide light and the virtual image 20V of the display information are visually recognized at the same time, thereby enabling the sense of distance to be achieved. Also, since the plurality of luminous bodies 56 is disposed within the case 10, the HUD device 3 can be prevented from being upsized. Also, the HUD device 3 can be configured inexpensively without requiring a complicated mechanism.

Also, since the virtual images 56V of the guide light are largely displayed, the visibility of the guide light can be improved. Also, the display light L of the display source 20 reflected toward the reflector 30 from the inner surfaces of the pair of side walls 14 and 15 of the case 10 is shielded by the light guide member 57. Also, the display light L of the display source 20 is prevented from being reflected by the light emitting surface. As a result, a ghost (dual display) of the virtual image of the display information, and the deterioration of a contrast of the virtual image by lightening the interior of the case are prevented, thereby enabling the visibility of the display information to be improved.

In this embodiment, the light entrance surface 57a provided on one end of the light guide member 57 is formed into a plane. However, the present invention is not limited to this configuration. For example, the light emitting surface 57b may be formed into a convex lens as illustrated in FIG. 21(a), or formed into a concave lens as illustrated in FIG. 21(b). Alternatively, as illustrated in FIG. 21(c), the light emitting surface 57b of the light guide member 57 is provided with a total reflection surface 57e formed by obliquely notching one end of the light emitting surface 57b, and the light of the light source 58 is input to one end of a back surface 57f opposed to the light emitting surface 57b so that the light is totally reflected by the total reflection surface 57e. The shapes and the arrangements of the light guide member 57 and the light source 58 are arbitrary unless contrary to the purpose of the present invention.

Also, in this embodiment, the lengths of the respective light guide members 57 are identical with each other. However, the present invention is not limited to this configuration. For example, as in an HUD device 3A illustrated in FIG. 22, the length of the light guide members 57 may be gradually shortened from the reflector 30 toward the display source 20. With this configuration, a depth sense can be more created.

The above-described embodiments merely represent typical examples of the present invention, and the present invention is not limited to those embodiments. That is, the above embodiments can be variously modified and implemented without departing from the subject matter of the present invention.

The present invention has been described in detail and with reference to specific embodiments, but it would be obvious to one skilled in the art that the embodiments can be variously modified and changed without departing from the spirit and scope of the present invention.

The present invention is based on Japanese Patent Application No. 2009-288069 filed on Dec. 18, 2009, and content thereof is incorporated herein by reference.

REFERENCE SIGNS LIST 1, 1A, 2, 3, 3A, head-up display device
10, case
14, 15, a pair of side walls
19, opening
20, display source
20a, display surface
20V, virtual image of display information
30, reflector
30a, reflection surface
30b, rotating shaft
40, driver (reflector displacement unit)
50, 50A, 55, guide line unit
51, 52, 52A, 52B, 56, luminous body
51V, 56V, virtual images of guide light
53, 53A, 53B, 57, light guide member
54, 58, light source
57b, light emitting surface
60, controller (light emission control unit)
70, window shield
71, projection area
83, opening bezel
83V, virtual image of opening bezel
L, display light

The invention claimed is:

1. A head-up display device, including:
   a box-shaped case having an opening;
   a display source that is disposed within the case;
   a reflector that is displaceably disposed within the case so as to reflect the display light of the display information displayed on the display source toward a projection area disposed in a window shield of a vehicle through an opening of the case; and
   a reflector displacement unit that displaces the reflector so as to move a projection position of the display light on the projection area in a vertical direction of the vehicle;
   wherein the head-up display device is equipped with a guide light unit having at least one of a plurality of luminous bodies aligned along an optical path of the display light, and a rod-like luminous body arranged along the optical path of the display light, on an inner surface of the case between the display source and the reflector.

2. The head-up display device according to claim 1, wherein the luminous bodies are disposed in parallel to the optical path of the display light on at least one inner surface of a pair of side walls of the case which face each other in a horizontal direction of the display source.

3. The head-up display device according to claim 1, further comprising a light emitting control unit that allows the luminous bodies to emit light in the order from one end thereof toward the other end.

4. The head-up display device according to claim 1, wherein the guide light unit includes the plurality of luminous bodies, the plurality of luminous bodies each includes a light source, and a prismatic light guide member that is protruded from the inner surface of the case so that a longitudinal direction thereof is orthogonal to the optical path of the display light, and guides the light of the light source to a light emitting surface facing the inside of the case, and allows the light to be emitted therefrom, and the light emitting surface of the light guide member is inclined to be closer to the inner surface of the case toward the reflector from the display source.

5. The head-up display device according to claim 1, wherein at least one of the luminous bodies includes a light source.

6. The head-up display device according to claim 1, wherein each of the luminous bodies includes a light source.

7. The head-up display device according to claim 1, wherein the guide light unit includes the plurality of luminous bodies, and the plurality of luminous bodies each includes a light source.

8. The head-up display device according to claim 1, wherein at least one of the luminous bodies is a light emitting diode.

9. The head-up display device according to claim 1, wherein each of the luminous bodies is a light emitting diode.

10. The head-up display device according to claim 1, wherein the guide light unit includes the plurality of luminous bodies, and the plurality of luminous bodies each is a light emitting diode.

* * * * *